US012206907B2

(12) United States Patent
Huang et al.

(10) Patent No.: US 12,206,907 B2
(45) Date of Patent: Jan. 21, 2025

(54) ADAPTIVE LOCAL RESHAPING FOR SDR-TO-HDR UP-CONVERSION

(71) Applicant: DOLBY LABORATORIES LICENSING CORPORATION, San Francisco, CA (US)

(72) Inventors: Tsung-Wei Huang, Sunnyvale, CA (US); Guan-Ming Su, Fremont, CA (US); Neeraj J. Gadgil, Pune (IN)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 0 days.

(21) Appl. No.: 18/029,901

(22) PCT Filed: Oct. 1, 2021

(86) PCT No.: PCT/US2021/053241
§ 371 (c)(1),
(2) Date: Mar. 31, 2023

(87) PCT Pub. No.: WO2022/072884
PCT Pub. Date: Apr. 7, 2022

(65) Prior Publication Data
US 2023/0370646 A1 Nov. 16, 2023

Related U.S. Application Data

(60) Provisional application No. 63/086,699, filed on Oct. 2, 2020.

(30) Foreign Application Priority Data

Oct. 2, 2020 (EP) .................................... 20199785

(51) Int. Cl.
*H04N 23/741* (2023.01)
*G06T 5/20* (2006.01)
(Continued)

(52) U.S. Cl.
CPC ............... *H04N 19/85* (2014.11); *G06T 5/20* (2013.01); *G06T 5/92* (2024.01); *G06T 5/94* (2024.01);
(Continued)

(58) Field of Classification Search
None
See application file for complete search history.

(56) References Cited

U.S. PATENT DOCUMENTS 8,208,560 B2 * 6/2012 Chiu ....................... H04N 19/34
382/238
9,264,681 B2 * 2/2016 Gish ......................... H04N 9/67
(Continued)

FOREIGN PATENT DOCUMENTS

WO 2017011636 A1 1/2017
WO 2017024042 A2 2/2017
(Continued)

OTHER PUBLICATIONS

Getreuer, Pascal "A Survey of Gaussian Convolution Algorithms" published in Image Processing on Line on Dec. 17, 2013, vol. 3, pp. 286-310, 25 pages.
(Continued)

*Primary Examiner* — Mushfikh I Alam

(57) ABSTRACT

A global index value is generated for selecting a global reshaping function for an input image of a relatively low dynamic range using luma codewords in the input image. Image filtering is applied to the input image to generate a filtered image. The filtered values of the filtered image provide a measure of local brightness levels in the input image. Local index values are generated for selecting specific local reshaping functions for the input image using the global index value and the filtered values of the filtered image. A reshaped image of a relatively high dynamic range (Continued)

is generated by reshaping the input image with the specific local reshaping functions selected using the local index values.

15 Claims, 11 Drawing Sheets

(51) Int. Cl.
| | |
|---|---|
| *G06T 5/92* | (2024.01) |
| *G06T 5/94* | (2024.01) |
| *H04N 19/117* | (2014.01) |
| *H04N 19/169* | (2014.01) |
| *H04N 19/186* | (2014.01) |
| *H04N 19/80* | (2014.01) |
| *H04N 19/85* | (2014.01) |

(52) U.S. Cl.
CPC ......... *H04N 19/117* (2014.11); *H04N 19/186* (2014.11); *H04N 19/1887* (2014.11); *H04N 19/80* (2014.11); *G06T 2207/10016* (2013.01); *G06T 2207/20208* (2013.01)

(56) References Cited

U.S. PATENT DOCUMENTS

| | | | | |
|---|---|---|---|---|
| 10,032,262 | B2* | 7/2018 | Kheradmand | G06T 7/90 |
| 10,080,026 | B2* | 9/2018 | Su | H04N 19/1887 |
| 11,277,627 | B2* | 3/2022 | Song | H04N 19/186 |
| 2019/0104309 | A1* | 4/2019 | Su | H04N 19/124 |
| 2019/0124367 | A1* | 4/2019 | Lu | H04N 19/46 |
| 2019/0147572 | A1* | 5/2019 | Colaitis | G06T 5/92 |
| | | | | 345/589 |
| 2019/0349607 | A1* | 11/2019 | Kadu | H04N 19/177 |
| 2021/0358089 | A1* | 11/2021 | Wen | G06T 5/50 |
| 2023/0005243 | A1 | 1/2023 | Khalilian-Gourtani | |
| 2023/0146073 | A1* | 5/2023 | Kozlov | G06T 5/70 |
| | | | | 382/298 |
| 2023/0156343 | A1* | 5/2023 | Su | H04N 19/182 |
| | | | | 348/222.1 |
| 2023/0164366 | A1* | 5/2023 | Su | G06T 5/92 |
| | | | | 375/240.01 |
| 2023/0300381 | A1 | 9/2023 | Su | |

FOREIGN PATENT DOCUMENTS

| | | |
|---|---|---|
| WO | 2017053432 A1 | 3/2017 |
| WO | 2017201139 A1 | 11/2017 |
| WO | 2019023202 A1 | 1/2019 |
| WO | 2020068666 A1 | 4/2020 |

OTHER PUBLICATIONS

He, K. et al "Fast Guided Filter" cs.CV, 2015, pp. 1-2, 2 pages.

He, K. et al "Guided Image Filtering" IEEE Transactions on Pattern Analysis and Machine Intelligence, vol. 35, No. 6, Jun. 2013, pp. 1397-1409, 13 pages.

Huo Yongqing et al: "Physiological inverse tone mapping based on retina response", Visual Computer, Springer, Berlin, DE, vol. 30, No. 5, Sep. 13, 2013 (Sep. 13, 2013), pp. 507-517, XP035366280, 11 pages.

ITU-R BT. 2100 "Image Parameter Values for High Dynamic Range Television for Use in Production and International Programme Exchange" ITU, Jun. 2017, 17 pages.

ITU-R Recommendation ITU-R BT.1886 "Reference Electro-Optical Transfer Function for Flat Panel Displays Used in HDTV Studio Production" Mar. 2011, pp. 1-7. 7 pages.

Maurer, Calvin, Rensheng Qi, and Vijay Raghavan, "A Linear Time Algorithm for Computing Exact Euclidean Distance Transforms of Binary Images in Arbitrary Dimensions," IEEE Transactions on Pattern Analysis and Machine Intelligence, vol. 25, No. 2, pp. 265-270, Feb. 2003, 6 pages.

SMPTE 2084:2014 "High Dynamic Range Electro-Optical Transfer Function of Mastering Reference Displays" Aug. 16, 2014, 14 pages.

Wells, William, "Efficient Synthesis of Gaussian Filters by Cascaded Uniform Filters" IEEE Transactions on Pattern Analysis and Machine Intelligence, vol. 8, No. 2, pp. 234-239.

* cited by examiner

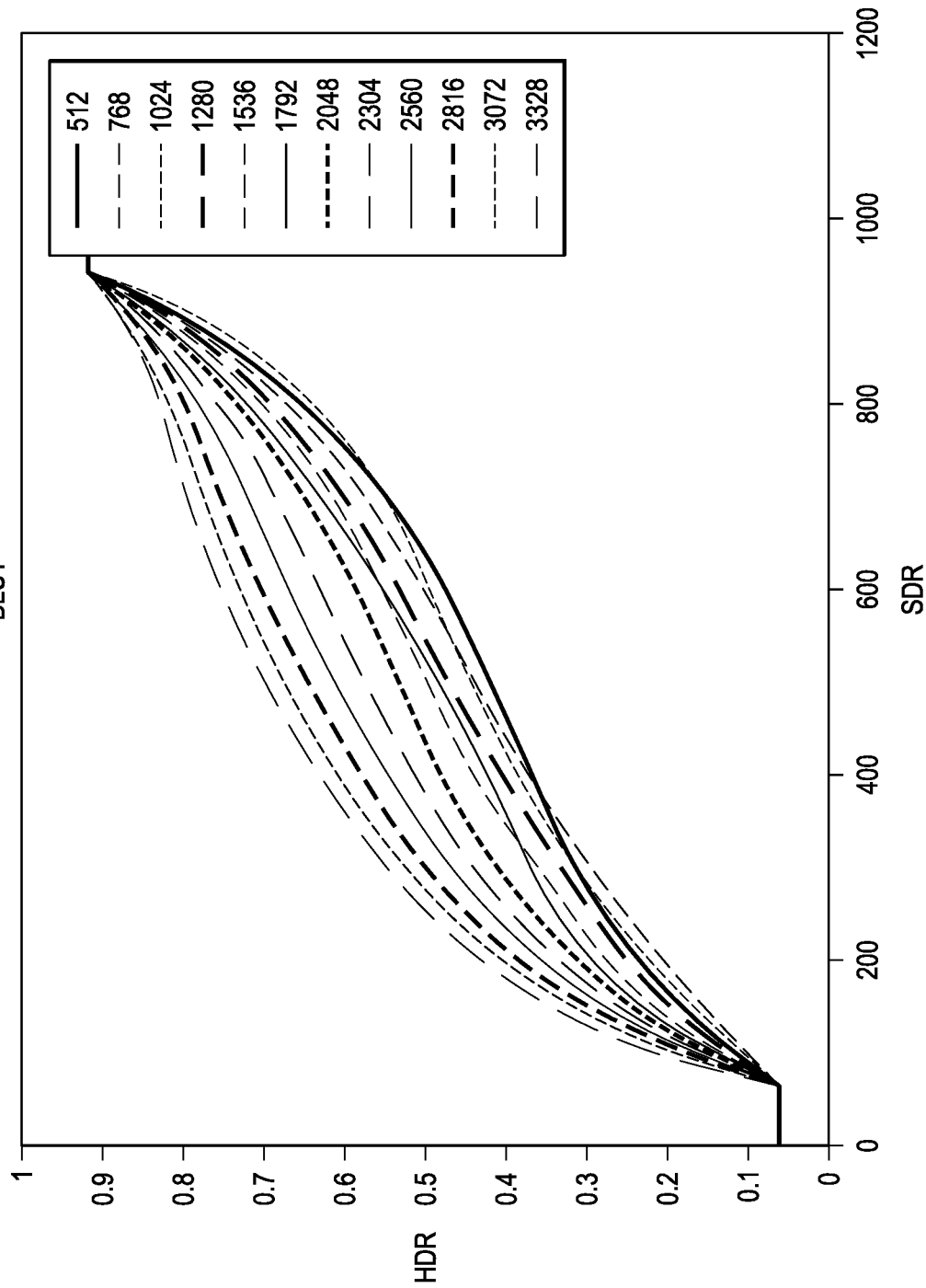

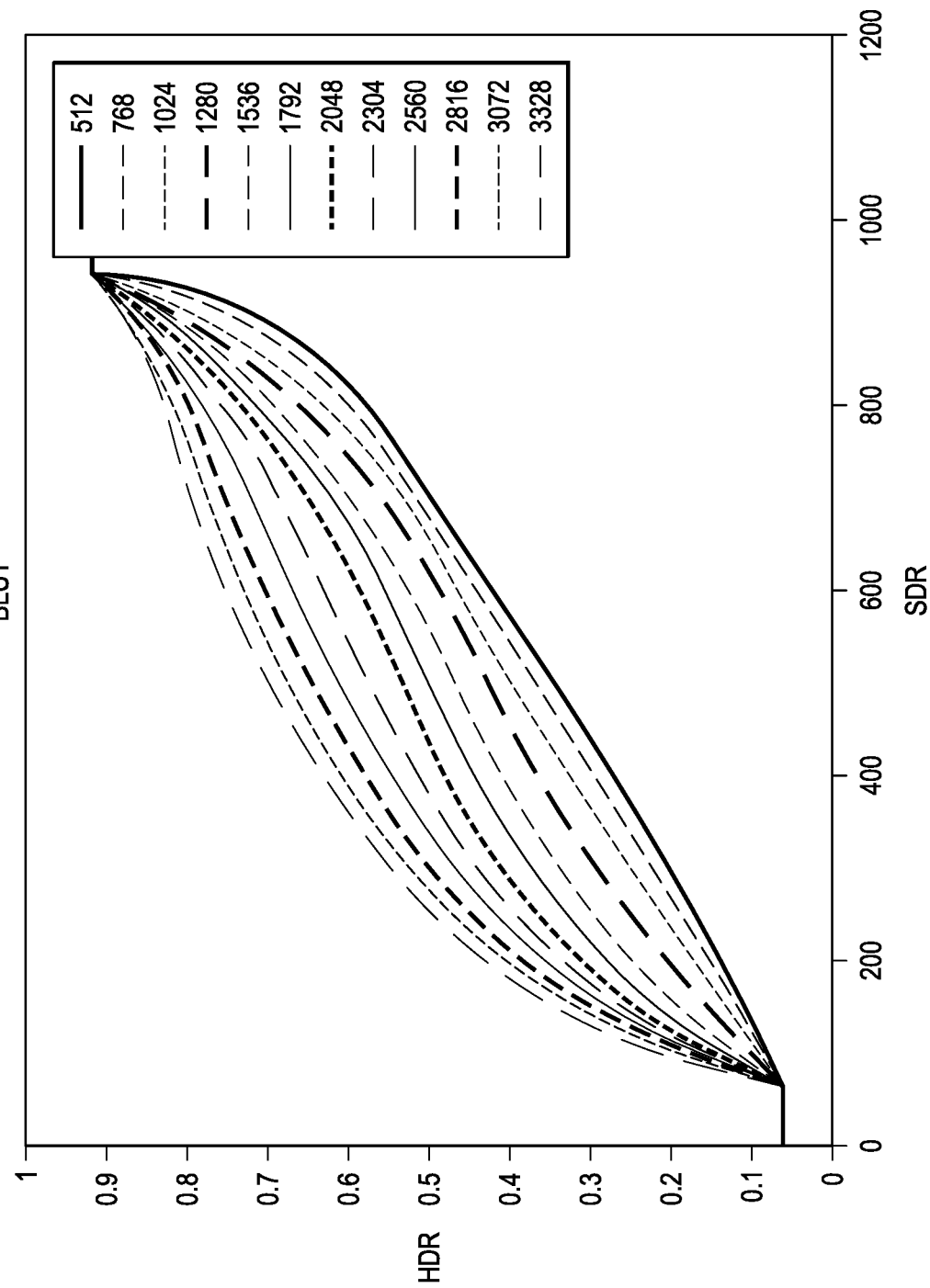

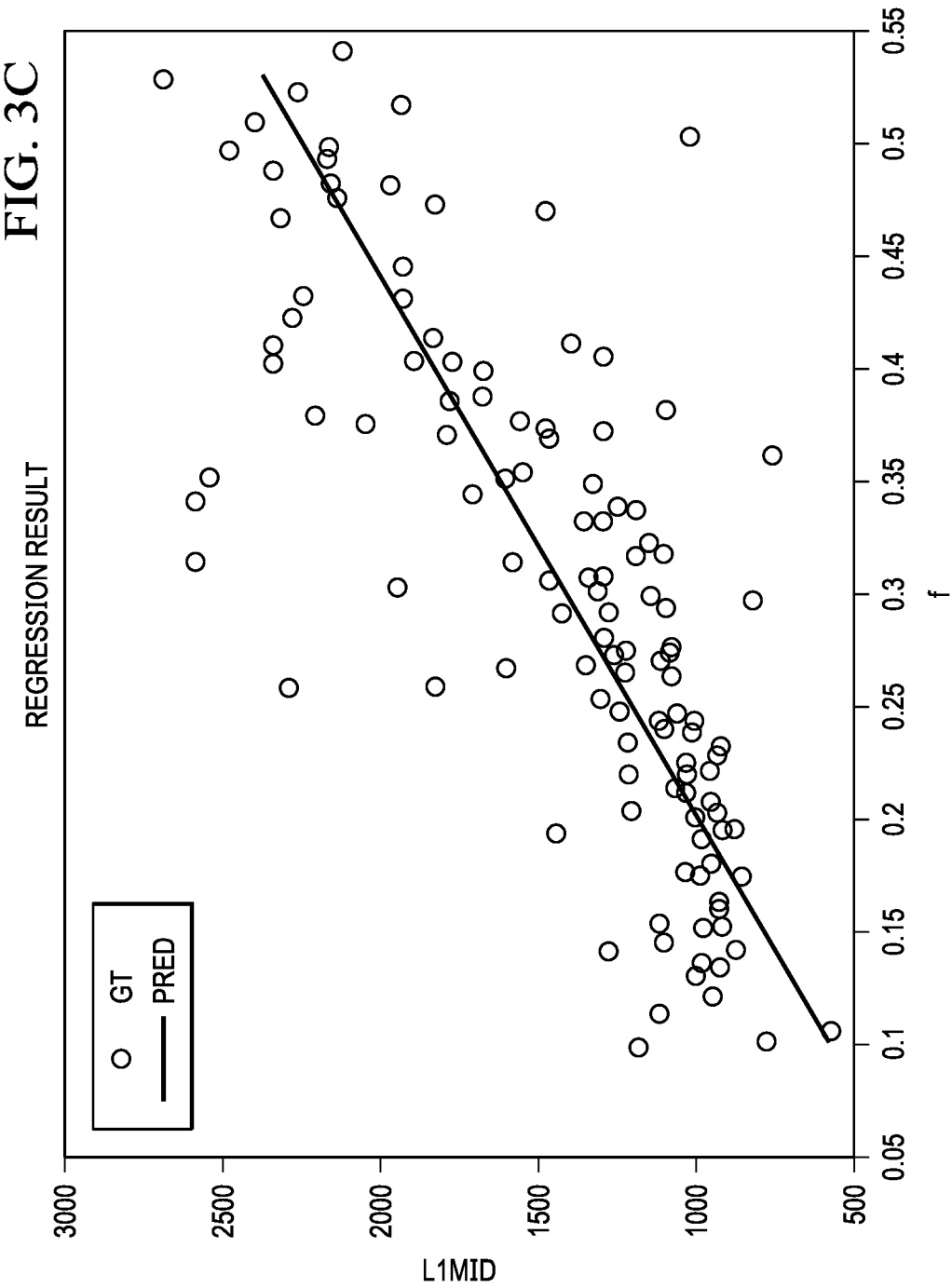

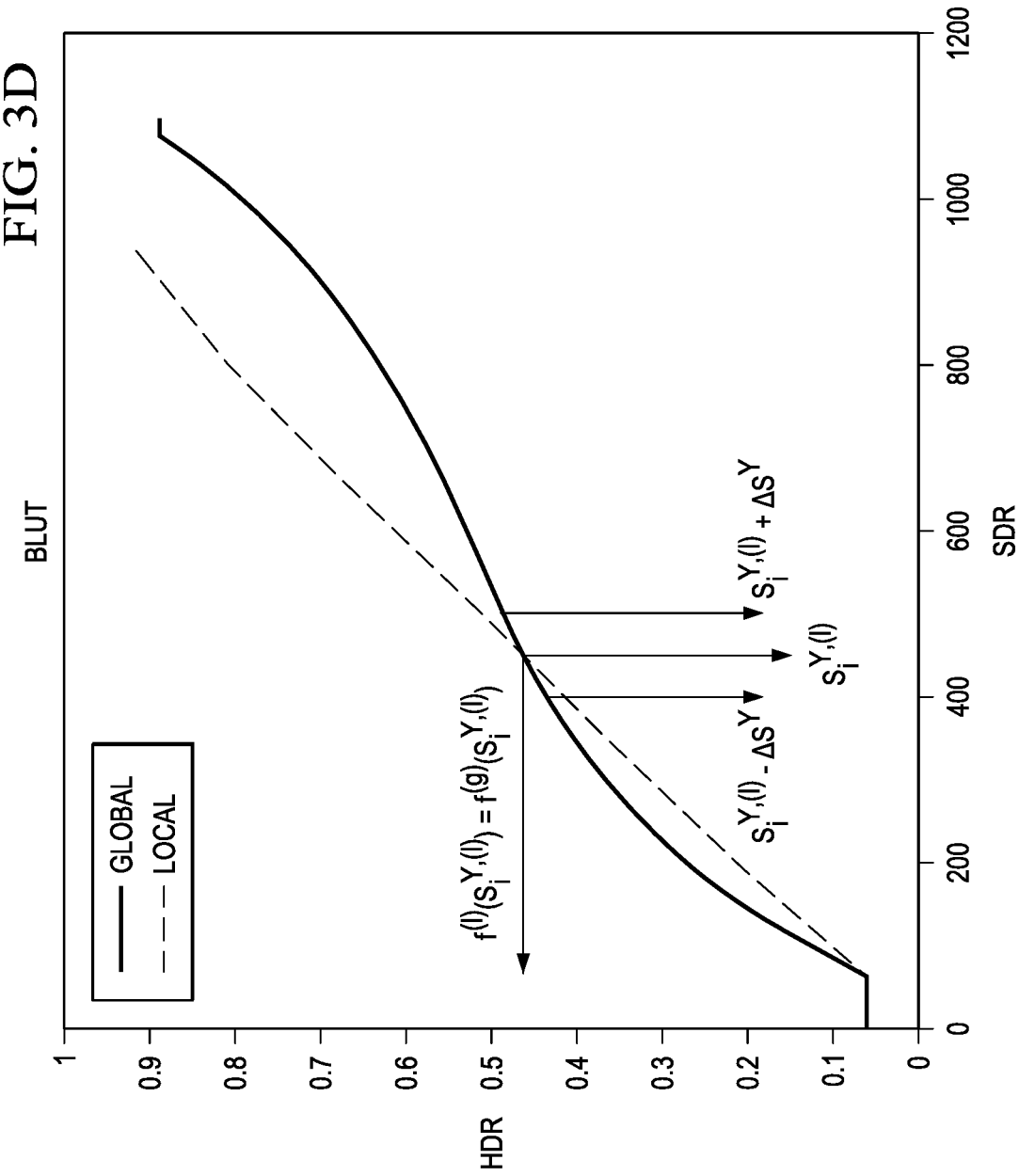

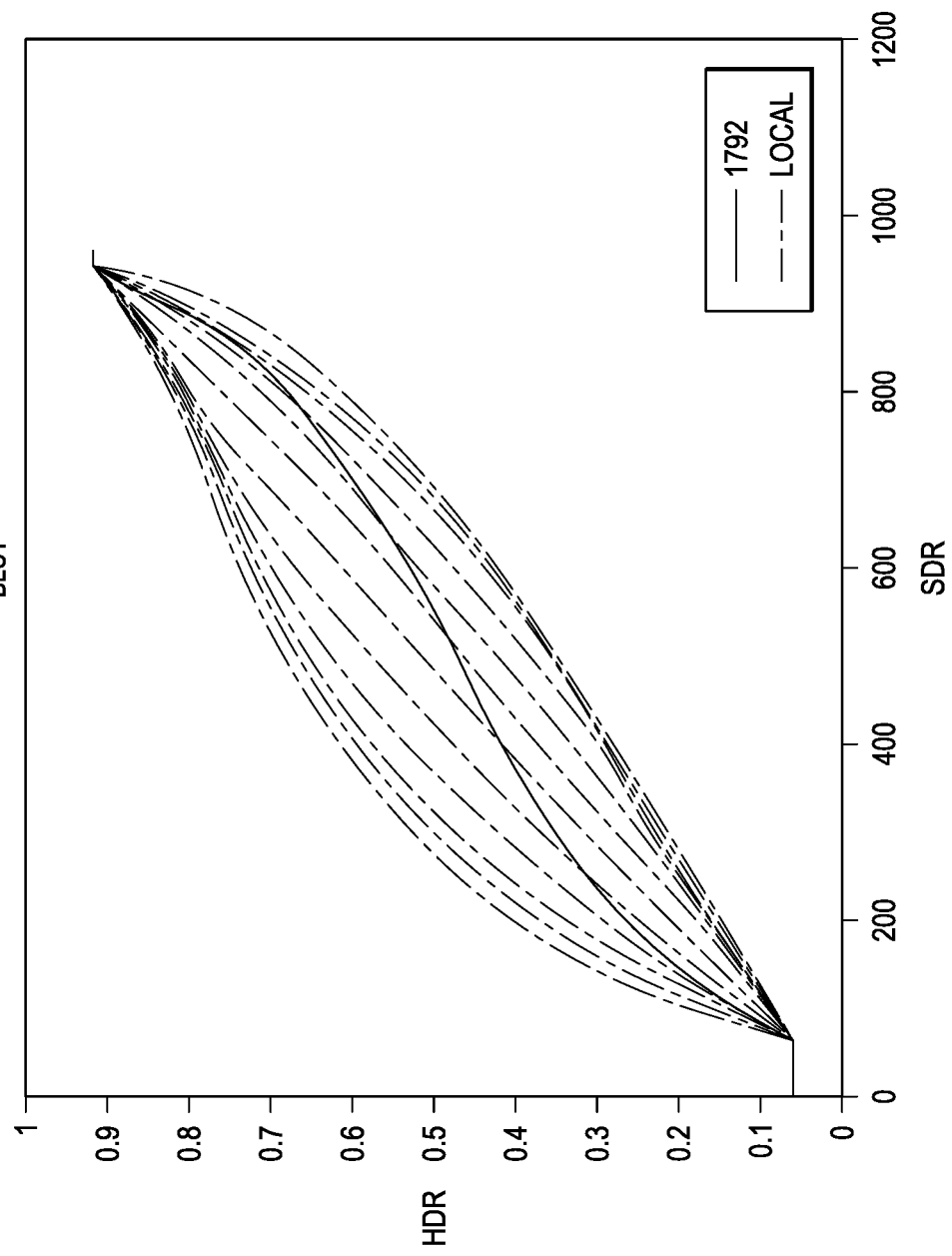

ADAPTIVE LOCAL RESHAPING FOR SDR-TO-HDR UP-CONVERSION

CROSS-REFERENCE TO RELATED APPLICATIONS

This application claims priority to U.S. Provisional Application No. 63/086,699 and European Patent Application No. 20199785.5, both filed on Oct. 2, 2020, each of which is incorporated by reference in its entirety.

TECHNOLOGY

The present disclosure relates generally to image processing operations. More particularly, an embodiment of the present disclosure relates to video codecs.

BACKGROUND

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. While perhaps somewhat narrower in relation to true scene referred HDR, EDR nonetheless represents a wide DR breadth and may also be referred to as HDR.

In practice, images comprise one or more color components (e.g., luma Y and chroma Cb and Cr) of a color space, where each color component is represented by a precision of n-bits per pixel (e.g., n=8). Using non-linear luminance coding (e.g., gamma encoding), images where n≤8 (e.g., color 24-bit JPEG images) are considered images of standard dynamic range, while images where n>8 may be considered images of enhanced dynamic range.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays. Given a video stream, information about its EOTF may be embedded in the bitstream as (image) metadata. The term "metadata" herein relates to any auxiliary information transmitted as part of the coded bitstream and assists a decoder to render a decoded image. Such metadata may include, but are not limited to, color space or gamut information, reference display parameters, and auxiliary signal parameters, as those described herein.

The term "PQ" as used herein refers to perceptual luminance amplitude quantization. The human visual system responds to increasing light levels in a very nonlinear way. A human's ability to see a stimulus is affected by the luminance of that stimulus, the size of the stimulus, the spatial frequencies making up the stimulus, and the luminance level that the eyes have adapted to at the particular moment one is viewing the stimulus. In some embodiments, a perceptual quantizer function maps linear input gray levels to output gray levels that better match the contrast sensitivity thresholds in the human visual system. An example PQ mapping function is described in SMPTE ST 2084:2014 "High Dynamic Range EOTF of Mastering Reference Displays" (hereinafter "SMPTE"), which is incorporated herein by reference in its entirety, where given a fixed stimulus size, for every luminance level (e.g., the stimulus level, etc.), a minimum visible contrast step at that luminance level is selected according to the most sensitive adaptation level and the most sensitive spatial frequency (according to HVS models).

Displays that support luminance of 200 to 1,000 cd/m$^2$ or nits typify a lower dynamic range (LDR), also referred to as a standard dynamic range (SDR), in relation to EDR (or HDR). EDR content may be displayed on EDR displays that support higher dynamic ranges (e.g., from 1,000 nits to 5,000 nits or more). Such displays may be defined using alternative EOTFs that support high luminance capability (e.g., 0 to 10,000 or more nits). An example of such an EOTF is defined in SMPTE 2084 and Rec. ITU-R BT.2100, "Image parameter values for high dynamic range television for use in production and international programme exchange," (06/2017). As appreciated by the inventors here, improved techniques for converting input video content data to output video content with high dynamic range, high local contrast and vivid color are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not by way of limitation, in the figures of the accompanying drawings and in which like reference numerals refer to similar elements and in which:

FIG. 3A illustrates example backward reshaping functions; FIG. 3B illustrates example basic reshaping functions after adjustments and modifications; FIG. 3C illustrates an example least squared solution; FIG. 3D illustrates example global and local reshaping functions; FIG. 3E and FIG. 3F illustrate example local reshaping functions.

DESCRIPTION OF EXAMPLE EMBODIMENTS

Figure 1:
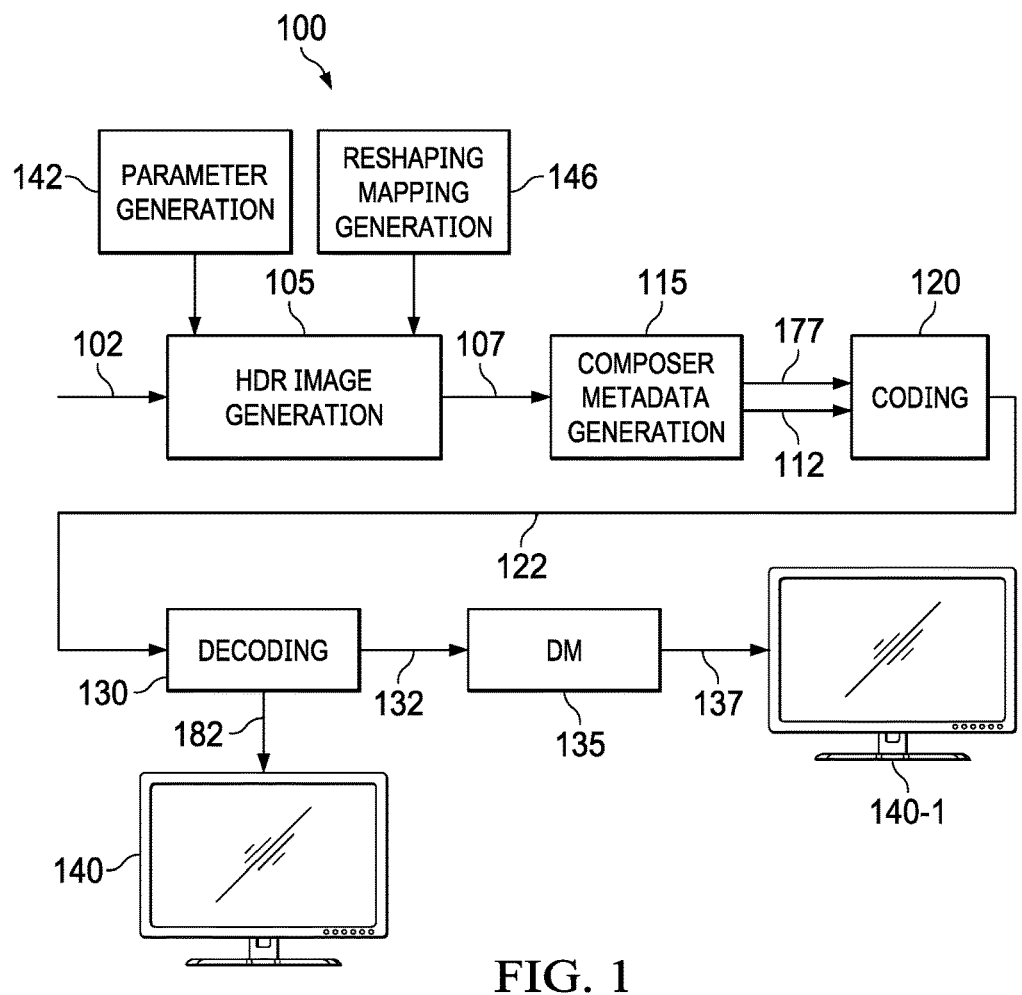
FIG. 1 depicts an example process of a video delivery pipeline.

In the following description, for the purposes of explanation, numerous specific details are set forth in order to provide a thorough understanding of the present disclosure. It will be apparent, however, that the present disclosure may be practiced without these specific details. In other instances, well-known structures and devices are not described in exhaustive detail, in order to avoid unnecessarily occluding, obscuring, or obfuscating the present disclosure.

SUMMARY

Local reshaping techniques as described herein can be implemented to (backward) reshape or up-convert image data of a relatively narrow dynamic range such as SDR image data into image data of a higher dynamic range such as HDR image data with enhanced local contrast and color saturation.

As used herein, "up-convert" or "(backward) reshape" refers to convert image data of a lower dynamic range to image data of a higher dynamic range through reshaping operations such as local reshaping operations under techniques as described herein, global reshaping operations under some other approaches, etc.

Global reshaping refers to up-conversion or backward reshaping operations that applies the same global reshaping function/mapping to all pixels of an input image such as an input SDR image to generate a corresponding output image—such as a reshaped HDR image—depicting the same visual semantic content as the input image.

For example, HDR luma or luminance codewords in the reshaped HDR image may be composed or up-converted from applying the same global reshaping function—such as the same 8-piece second order polynomial or the same backward look up table (BLUT)— to SDR luma or luminance codewords of all pixels in the input SDR image.

Likewise, HDR chroma or chrominance codewords in the reshaped HDR image may be composed or up-converted from applying the same global reshaping mapping—such as the same backward multivariate multiple regression (backward MMR or BMMR) mapping specified with a set of MMR coefficients—to SDR codewords (in luma and chroma channels) of all pixels in the input SDR image.

Example backward reshaping operations are described in U.S. Provisional Patent Application Ser. No. 62/136,402, filed on Mar. 20, 2015, (also published on Jan. 18, 2018, as U.S. Patent Application Publication Ser. No. 2018/0020224), and PCT Application Ser. No. PCT/US2019/031620, filed on May 9, 2019, their entire contents of which are hereby incorporated by reference as if fully set forth herein.

In contrast with global reshaping that applies the same reshaping function or mapping to all pixels of the input image, local reshaping refers to up-conversion or backward reshaping operations that apply different reshaping functions or mappings to different pixels of the input image. Thus, in local reshaping, a first reshaping function applied to a first pixel of the input image may be a different function from a second reshaping function applied to a second different pixel of the input image.

A specific reshaping function can be selected or identified for a specific pixel of the input image with a local brightness level of a local region containing the specific pixel. The local bright level can be estimated with image filtering such as multi-level edge-preserving filtering with guidance image. Under techniques as described herein, the image filtering used to estimate or predict local brightness level can be performed in a manner that minimizes leakage of (e.g., pixel value, codeword, etc.) information between different visual objects/characters/regions/segments for the purpose of reducing or preventing visual artifacts such as halo artifacts.

Local reshaping as described herein can take into consideration local-area image characteristics in the input image. The different reshaping functions or mappings, which can be localized to every single pixel of the input image, enhance local contrast and color saturation (levels) in the output image and make the overall output image to be of higher local contrast ratios, better viewer perceptible image details, more vivid colors, etc.

Example embodiments described herein relate to generating images of a first dynamic range from input images of a second dynamic range lower than the first dynamic range. A global index value is generated for selecting a global reshaping function for an input image of the second dynamic range. The global index value is generated using luma codewords in the input image. Image filtering is applied to the input image to generate a filtered image. Filtered values of the filtered image provide a measure of local brightness levels in the input image. Local index values are generated for selecting specific local reshaping functions for the input image. The local index values are generated using the global index value and the filtered values of the filtered image. A reshaped image of the first dynamic range is caused to be generated at least in part by reshaping the input image with the specific local reshaping functions selected using the local index values.

Example Video Delivery Processing Pipeline

FIG. 1 depicts an example process of a video delivery pipeline (100) showing various stages from video capture/generation to an HDR or SDR display. Example HDR displays may include, but are not limited to, image displays operating in conjunction with TVs, mobile devices, home theaters, etc. Example SDR displays may include, but are not limited to, SDR TVs, mobile devices, home theater displays, head-mounted display devices, wearable display devices, etc. It should be noted that SDR to HDR up-conversion can be performed in either encoder/server side (before video compression) or decoder/playback side (after the video decompression). To support playback side SDR to HDR up-conversion, different system configurations other than what is depicted in FIG. 1 may be used. Different image metadata formats other than what is used by processing components as depicted in FIG. 1 may be used to convey image metadata in these different system configurations.

In preferred embodiments of the present invention, the image metadata comprise L1 metadata. As used herein, the term "L1 metadata" denotes one or more of minimum (L1-min), medium (L1-mid), and maximum (L1-max) luminance values related to a particular portion of the video content, e.g. an input frame or image. L1 metadata are related to a video signal. In order to generate L1 metadata, a pixel-level, frame-by-frame analysis of the video content is performed, preferably on the encoding end. Alternatively, the analysis may be performed on the decoding end. The analysis describes the distribution of luminance values over defined portions of the video content as covered by an analysis pass, for example a single frame or a series of frames like a scene. L1 metadata may be calculated in an analysis pass covering single video frames and/or series of frames like a scene. L1 metadata may comprise various values that are derived during the analysis pass together forming the L1 metadata associated with the respective portion of the video content from which the L1 metadata have been calculated and associated with the video signal. The L1 metadata comprise at least one of (i) an L1-min value representing the lowest black level in the respective portion of the video content, (ii) an L1-mid value representing the average luminance level across the respective portion of the video content, and (iii) an L1-max value representing the highest luminance level in the respective portion of the video content. Preferably, the L1 metadata are generated for and attached to each video frame and/or to each scene encoded in the video signal. L1 metadata may also be generated for regions of an image which are referred to as local L1 values. L1 metadata may be computed by converting RGB data to a luma-chroma format (e.g., YCbCr) and then computing at least one or more of min, mid (average), and max values in the Y plane, or they can be computed directly in the RGB space.

In some embodiments, an L1-min value denotes the minimum of the PQ-encoded min(RGB) values of the respective portion of the video content (e.g. a video frame or image), while taking into consideration only an active area (e.g., by excluding gray or black bars, letterbox bars, and the like), where min(RGB) denotes the minimum of color component values {R, G, B} of a pixel. The L1-mid and L1-max values may also be computed in a same fashion. In particular, in an embodiment, L1-mid denotes the average of the PQ-encoded max(RGB) values of the image, and L1-max denotes the maximum of the PQ-encoded max (RGB) values of the image, where max(RGB) denotes the maximum of color component values {R, G, B} of a pixel. In some embodiments, L1 metadata may be normalized to be in [0, 1].

For the purpose of illustration only, FIG. 1 is used to illustrate or depict an SDR-HDR up-conversion process performed at server side using local backward reshaping techniques as described herein. The SDR to HDR up-conversion at the encoder/server side as illustrated in FIG. 1 uses input SDR image to generate locally reshaped HDR images. The combination of the input SDR images and the locally reshaped HDR images can be used by a backward-compatible codec or non-backward compatible codec to generate a backward-compatible or non-backward compatible SDR video signal. In some operational scenarios, as illustrated in FIG. 1, the video signal may be encoded with reshaped SDR images generated by forward reshaping the locally reshaped HDR images.

Video frames such as a sequence of consecutive input SDR images 102 can be received by an HDR image generation block 105. These SDR images (102) may be received from a video source or retrieved from a video data store. Some or all of the SDR images (102) can be generated from source images, for example through (e.g., automatic with no human input, manual, automatic with human input, etc.) video editing or transformation operations, color grading operations, etc. The source images may be digitally captured (e.g. by a digital camera), generated by converting analog camera pictures captured on film to a digital format, generated by a computer (e.g. using computer animation, image rendering, etc.), and so forth. The SDR images (102) may be images relating to one or more of: movie releases, archived media programs, media program libraries, video recordings/clips, media programs, TV programs, user-generated video contents, etc.

The HDR image generation block (105) applies local reshaping operations to each SDR image in the sequence of consecutive SDR images (102) to generate a respective (reshaped) HDR image in a sequence of corresponding consecutive (reshaped) HDR images that depict the same visual semantic content as the SDR images (102) but with higher dynamic range, more vivid colors, etc., in comparison with the SDR images (102).

A parameter generation block 142 generates specific values for at least some operational parameters used in the local reshaping operations based on a predictive model for predicting operational parameter values. The predictive model can be trained using training images such as HDR-SDR image pairs in a training dataset and ground truths relating to the training images or the image pairs.

A family of luma or Y channel reshaping functions and a family of chroma channel reshaping mappings can be generated by a reshaping mapping generation block 146 and pre-loaded by the reshaping mapping generation block (146) into the image generation block (105), for example during a system boot-up period before the SDR images (102) are processed to generate the reshaped HDR images. The family of reshaping functions for the luma or Y channel may comprise a plurality of BLUTs for (or indexed by) a plurality of different L1-mid values. The family of reshaping functions for the chroma channels may comprise a plurality of BMMR mappings for (or indexed by) the same plurality of different L1-mid values.

For each input SDR image, the HDR image generation block (105) generates or computes local brightness levels up to per-pixel precision from luma or Y channel codewords in the input SDR image. In some operational scenarios, an overall filtered image may be generated from the luma or Y channel codewords of the input SDR image, for example, as a weighted sum of filtered images generated through multi-level edge-preserving filtering. Filtered values in the overall filtered image may be used to estimate or approximate the local bright levels, which is then used as a part of input to estimate or predict local L1-mid values up to per-pixel precision. The local L1-mid values may be represented in a L1-mid map and used as indexes to select, from the family of BLUTs, local reshaping functions or BLUTs for the luma channel up to per-pixel precision. These local reshaping functions or BLUTs, as selected with the local L1-mid values, provide higher slopes locally or higher local contrast ratios. Additionally, optionally or alternatively, the local L1-mid values represented in the L1-mid map can be used as indexes to select, from the family of BMMR mappings, local reshaping mappings or BMMRs for the chroma channels up to per-pixel precision.

Hence, based on individual local mid value maps generated for the input SDR images (102) and the preloaded families of BLUTs and BMMRs, the HDR image generation block (105) can perform the local reshaping operations on the input SDR images (102) to generate the corresponding reshaped HDR images of higher dynamic range, higher local contrasts, more vivid colors, etc., as compared with the SDR images (102).

Some or all of the SDR images (102) and the reshaped HDR images can be provided to a composer metadata generation block 115 to generate reshaped SDR images 112—which may be more efficiently coded than the input SDR images (102)—through forward reshaping the reshaped HDR images as well as to generate image metadata 177 (e.g., composer metadata, etc.). The image metadata (177) may include composer data to generate backward reshaping mappings (e.g., BLUT, a backward reshaping function/curve or polynomial set, MMR coefficients, etc.) which when applied to an input SDR image generate a corresponding HDR image.

The reshaped SDR images (112) and the image metadata (177) may be encoded by a coding block 120 in a video signal 122 (e.g., a coded bitstream, etc.) or a set of consecutive video segments. Given the video signal (122), a recipient device such as a mobile phone can decide—as a part of internally processing or post-processing the video signal (122) on the device—to use the metadata along with the SDR image data to generate and render images with higher dynamic range such as HDR and more vivid color within display capabilities of the recipient device. Additionally, optionally or alternatively, the video signal (122) or video segments allow backwards compatibility with legacy SDR displays which can ignore the image metadata (177) and simply display the SDR image.

Example video signals or video segments may include, but are not necessarily limited to, single layer video signals/segments, etc. In some embodiments, the coding block (120) may comprise audio and video encoders, such as those defined by ATSC, DVB, DVD, Blu-Ray, and other delivery formats, to generate the video signal (122) or video segments.

The video signal (122) or video segments are then delivered downstream to receivers such as mobile devices, tablet computers, decoding and playback devices, media source devices, media streaming client devices, television sets (e.g., smart TVs, etc.), set-top boxes, movie theaters, and the like. In a downstream device, the video signal (122) or video segments are decoded by decoding block (130) to generate decoded images 182, which may be similar to or the same as the reshaped SDR images (112) subject to quantization errors generated in compression performed by the coding block (120) and decompression performed by the decoding block (130) and/or transmission errors and/or synchronization errors and/or errors caused by packet loss.

In a non-limiting example, the video signal (122) (or video segments) may be backward compatible SDR video signal (or video segments). Here, a "backward compatible" refers to a video signal or video segments that carry SDR images optimized (e.g., with specific artistic intent preserved, etc.) for SDR displays.

The decoding block (130) can also retrieve or decode the image metadata (177) from the video signal (122) or video segments. The image metadata (177) specifies backward reshaping mappings that can be used by the downstream decoders to perform backward reshaping on the decoded SDR images (182) to generate backward reshaped HDR images for rendering on an HDR (e.g., target, reference, etc.) display. The backward reshaping mappings represented in the image metadata (177) may be generated by the composer metadata generation block (115) through minimizing errors or differences between the backward reshaped HDR images generated with the image metadata (177) and the reshaped HDR images generated with the local reshaping operations. As a result, the image metadata (177) helps ensure that the backward reshaped HDR images generated with the image metadata (177) by the receiver relatively closely and accurately approximate the reshaped HDR images generated with the local reshaping operations.

Additionally, optionally, or alternatively, the image metadata (177) may include display management (DM) metadata that can be used by the downstream decoders to perform display management operations on the backward reshaped images to generate display images (e.g., HDR display images, etc.) optimized for rendering on an HDR display device.

In operational scenarios in which the receiver operates with (or is attached to) an SDR display 140 that supports the standard dynamic range or a relatively narrow dynamic range, the receiver can render the decoded SDR images directly or indirectly on the target display (140).

In operational scenarios in which the receiver operates with (or is attached to) an HDR display 140-1 that supports a high dynamic range (e.g., 400 nits, 1000 nits, 4000 nits, 10000 nits or more, etc.), the receiver can extract the composer metadata from (e.g., the metadata container in, etc.) the video signal (122) or video segments and use the composer metadata to compose HDR images (132), which may be backward reshaped images generated from backward reshaping the SDR images based on the composer metadata. In addition, the receiver can extract the DM metadata from the video signal (122) or video segments and apply DM operations (135) on the HDR images (132) based on the DM metadata to generate display images (137) optimized for rendering on the HDR display device (140-1) and render the display images (137) on the HDR display device (140-1).

For the purpose of illustration only, it has been described that local reshaping operations as described herein can be performed by an upstream device such as a video encoder to generate reshaped HDR images from SDR images. These reshaped HDR images are then used as target or reference HDR images by the video encoder to generate backward reshaping metadata that helps recipient devices generate backward reshaped HDR images that relatively closely or accurately approximates the reshaped HDR images generated from the local reshaping operations.

It should be noted that, in various embodiments, some or all local reshaping operations can be performed by a video encoder alone, a video decoder alone, a video transcoder alone, or a combination of the foregoing. For example, a video encoder can generate local L1-mid maps for SDR images comprising indexes to reshaping functions/mappings. Additionally, optionally or alternatively, a video decoder at the playback side or a video transcoder in between the video encoder and a video decoder can generate local L1-mid maps for SDR images comprising indexes to reshaping functions/mappings. The video encoder may not apply local backward reshaping operations to generate HDR images. The video encoder may defer the local backward reshaping operations to generate the HDR images by a video transcoder or a video decoder at a subsequent time. The local L1-mid maps can be included by the video encoder as a part of image metadata encoded with the SDR images in a video signal or video segments. The video transcoder or the video decoder may be pre-loaded with a family of BLUTs and/or a family of BMMR mappings. The local L1-mid maps for the SDR images can be used by the video transcoder or decoder to search for or look up for specific reshaping functions or mappings in the family of BLUTs and/or the family of BMMR mappings. The local reshaping operations up to a per-pixel precision can then be performed by the video transcoder or decoder on the SDR images to generate the reshaped HDR images, based at least in part on the specific reshaping functions/mappings looked up with indexes in the local L1-mid maps. In some operational scenarios, once the HDR images are generated through local reshaping, a video encoder can encode the HDR images or a version of HDR images derived from the locally reshaped HDR images in (e.g., a base layer of, etc.) a video signal, instead of encoding SDR images in (e.g., the base layer of, etc.) the video signal. The HDR images decoded from such a video signal may be directly watchable on an HDR display.

Local Reshaping

Figure 2A:
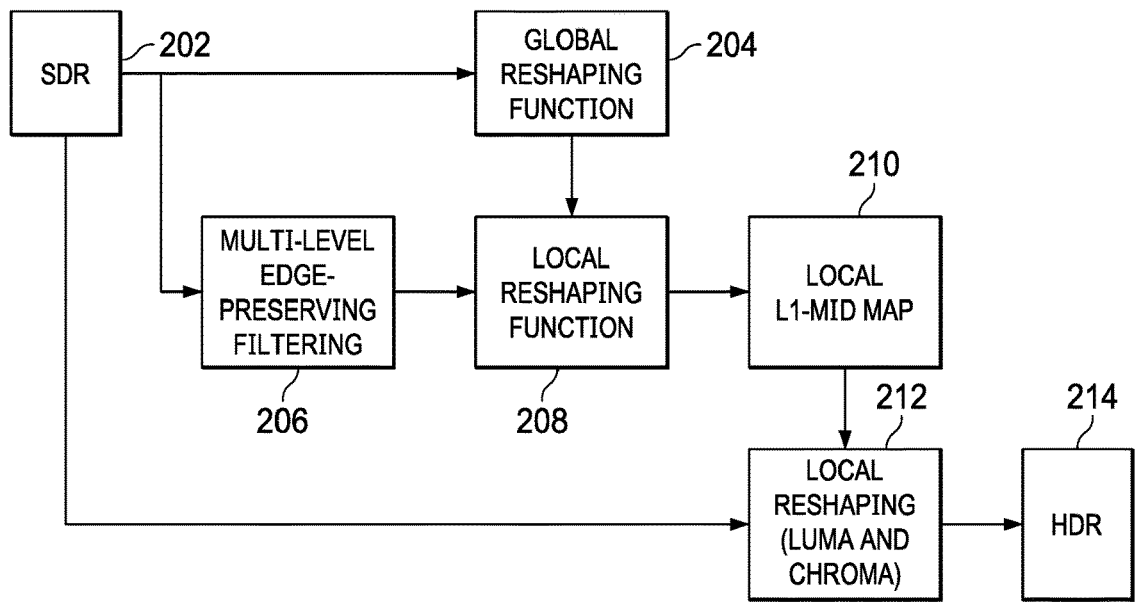
FIG. 2A illustrates an example flow for applying local reshaping operations.

FIG. 2A illustrates an example flow for applying local reshaping operations (e.g., 212, etc.) to generate corresponding HDR images from input SDR images. An image processing system, a coding block (e.g., 105 of FIG. 1, etc.) therein, or a decoding block (e.g., 130 of FIG. 1, etc.) therein, may implement or perform this process flow. In some operational scenarios, given an input SDR image 202, a global reshaping function 204 is selected to determine the main HDR look for an output HDR image 214 that is to be generated by the local reshaping operations from the input SDR image (202).

A plurality of basic reshaping functions may be determined—e.g., as an 8-piece second order polynomial for luma channel and MMR for chroma channels—at least in part (e.g., for codewords in luminance or luma channel, etc.) via a polynomial regression model and an MMR framework based on a training data set that comprises a population of image pairs of training HDR images and training SDR images.

In some operational scenarios, a (backward) reshaping function used to generate an HDR image from an SDR image may be specified by L1 metadata. The L1 metadata may comprise three parameters such as L1-max, L1-mid and L1-min values, which may be derived from HDR codewords (e.g., RGB codewords, YUV codewords, YCbCr codewords, etc.) of the HDR image. The L1-max value represents the highest luminance level in the video frame. The L1-mid value represents the average luminance level across the video frame. The L1-min value represents the lowest black level in the video frame. Alternatively or additionally, the (backward) reshaping is performed on the basis of L1 metadata that are related to the scene the current frame belongs to. One or more of these parameters specify the reshaping function. For example, L1-max and L1-min values are not taken into account, but the L1-mid value identifies or specifies the reshaping function. According to the present invention, one or more parameters from the L1 metadata, preferably the L1-mid value, are used for identifying a global reshaping function, and are referred to as global index value. Example building of constructions of forward and backward reshaping functions are described in U.S. Provisional Patent Application Ser. No. 63/013,063, "Reshaping functions for HDR imaging with continuity and reversibility constraints," by G-M. Su, filed on Apr. 21, 2020, and U.S. Provisional Patent Application Ser. No. 63/013,807 "Iterative optimization of reshaping functions in single-layer HDR image codec," by G-M. Su and H. Kadu, filed on Apr. 22, 2020, the contents of which are entirely incorporated herein by reference as if fully set forth herein.

A specific basic reshaping function may be selected—using an overall (e.g., global, per image/frame, etc.) L1-mid value determined, estimated or predicted from the input SDR image (202)—as the global reshaping function (204) from among the plurality of basic reshaping functions.

A goal for applying the local reshaping operations up to a per-pixel level to generate the HDR image (214) from the input SDR image (202) is to enhance local contrast ratios in local regions of the HDR image (214), without changing local brightness levels of these local regions of HDR image (214) so the main HDR look of the HDR image (214) as determined with the global reshaping function (204) is maintained.

To help prevent or reduce common artifacts such as halo artifacts that could be generated from changing local brightness levels adjacent to edges/boundaries of visual objects/characters, high-precision filtering such as multi-level edge-preserving filtering 206 may be applied to the input SDR image (202) into a filtered image. Alternatively, instead of selecting the global reshaping function on the basis of L1-mid values derived from the (unfiltered) input SDR image, the global reshaping function may be selected using an estimated or predicted overall (e.g., global, per image/frame, etc.) L1-mid value from the filtered input SDR image. The filtered image may be used to derive or estimate local brightness levels (or local region specific brightness levels) in different local regions (up to a per-pixel precision or up to a local region surrounding each pixel) of the input SDR image (202). The estimated local brightness levels in the different local regions (up to a per-pixel precision or up to a local region surrounding each pixel) of the input SDR image (202) may be used to estimate or predict local L1-mid values (up to a per-pixel precision or up to a local region surrounding each pixel) in the HDR image (214). Local L1 metadata describe the distribution of luminance values over a region surrounding a pixel. Regions may be defined down to single pixels, thereby supporting per-pixel precision when applying local reshaping. Local L1-max values represent the highest luminance level in the region. Local L1-mid values represent the average luminance level in the region. Local L1-min values represent the lowest black level in the region.

The high-precision filtering (206) used to estimate the local brightness levels of the SDR image (202)—which can then be used as input to a predictive model to predict the local L1-mid values in the HDR image (214)—may be specifically selected or adapted to avoid or reduce information leakage (or pixel value or codeword information diffusion) between different visual objects/characters, between visual objects/characters and backgrounds/foregrounds, adjacent to edges/boundaries of visual objects/characters depicted in the input SDR image (202) and/or to be depicted in the output HDR image (214).

To improve efficiency or response time of local reshaping operations, a family of local reshaping function(s) 208 may be loaded or built (e.g., initially, beforehand, etc.) in an image processing system as described herein during a system bootup period. The loading or building of the family of local reshaping function(s) (208) may be performed, before the reshaping or up-conversion of a sequence of consecutive input SDR images (e.g., including the input SDR image (202), etc.) into a sequence of corresponding consecutive output HDR images (e.g., including the HDR image (214), etc.) is performed based at least in part on the family of local reshaping function(s) (208). The family of local reshaping function(s) (208) may, but is not limited to, be generated—e.g., through extrapolation and/or interpolation—from the plurality of basic reshaping functions used to select the global reshaping function (204). Each local reshaping function in the family of local reshaping function(s) (208) may be indexed or identified in whole or in part using a respective value from the local L1 metadata, preferably the respective local L1-mid value, as in the case of the global reshaping function (204) or each basic reshaping function in the plurality of basic reshaping functions from which the global reshaping function (204) is selected. According to the present invention, one or more parameters from the L1 metadata, preferably the local L1-mid value, are used for identifying a local reshaping function and are referred to as local index value.

As noted, the filtered image generated by applying the multi-level edge-preserving filtering (206) to the input SDR image (202) may be used to generate or estimate the local brightness levels, which may be used in combination of or in reference to the global reshaping function in a predictive model to generate or predict the local L1-mid values. These local L1-mid values form indexes of a local L1-mid map 210, which may be used to look up for pixel-specific local reshaping functions in the family of local reshaping function(s) (208).

The pixel-specific local reshaping functions looked up by way of the indexes in the local L1-mid map (210) may be applied to the input SDR image (202) on a per-pixel level by the local reshaping operations (denoted as 212) to backward reshape SDR codewords in luma and chroma channels into reshaped HDR codewords of the HDR image (214) in luma and chroma channels. Each of these pixel-specific local reshaping functions in the form of a fine-tuned (up to per-pixel precision) non-linear function may be used to enhance local contrast and/or saturation in the HDR image (214).

Figure 2B:
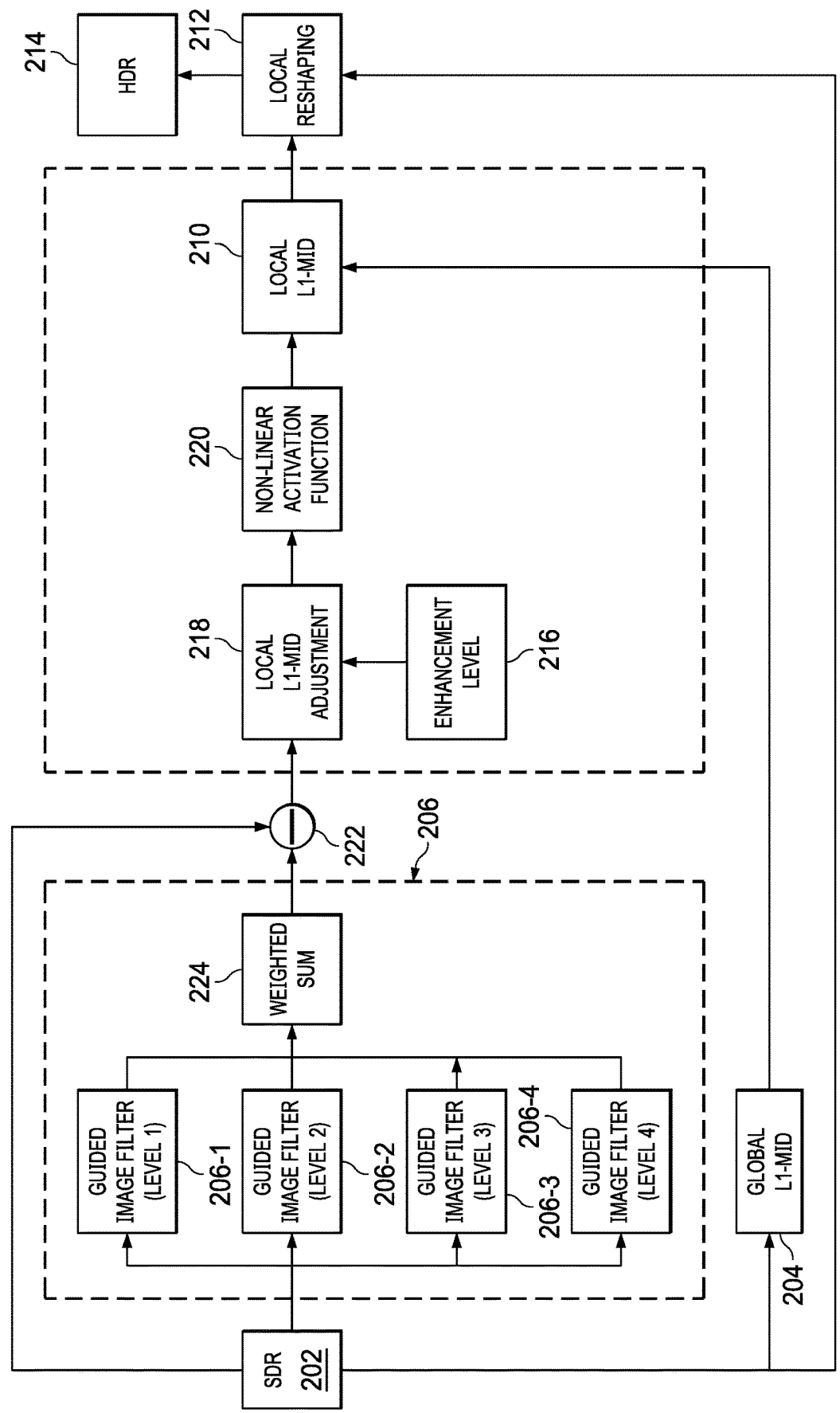
FIG. 2B illustrates an example framework or architecture in which an up-conversion process converts SDR images to HDR images through local reshaping operations.

FIG. 2B illustrates an example framework or architecture of an up-conversion process that converts input SDR images to output or reshaped HDR images through local reshaping operations (e.g., 212, etc.). The framework or architecture fuses filtered images of multiple levels generated by multi-level edge-preserving filtering an input SDR image (e.g., 202, etc.) into an overall filtered image. Filtered values in the overall filtered image serves as predictions, estimates and/or proxies for local brightness levels. These filtered values can then be used as a part of input to a predictive model to generate or predict local L1-mid values up to per-pixel precision. The local L1-mid values serve as indexes for selecting or looking up for specific local reshaping functions up to per-pixel precision. The selected local reshaping functions may be applied by the local reshaping operations (212) to the input SDR image for the purpose of generating a corresponding HDR image (e.g., 214, etc.). The framework or architecture may employ a few (e.g., major, etc.) components to carry out image processing operations relating to the local reshaping operations (212).

More specifically, a plurality of reshaping functions such as basic reshaping functions may be constructed first. In some operational scenarios, these basic reshaping functions may correspond to, and may be indexed with, different L1-mid values such as twelve different L1-mid values evenly or unevenly distributed in some or all of an entire HDR codeword space or range (e.g., 4096 for 12-bit HDR codeword space or range, etc.).

Given the input SDR image (202), a polynomial regression model (e.g., expression (3) below, etc.) may be used to generate or predict a global L1-mid value from a mean of luma or Y channel SDR codewords in the input SDR image (202). This global L1-mid value can be used to generate (e.g., with approximation, with interpolation, etc.) or select a specific reshaping function from the plurality of basic reshaping functions as a global reshaping function (e.g., 204, etc.) for the input SDR image (202). This global reshaping function provides or represents the main HDR look of an HDR image (e.g., 214, etc.). This main HDR look may be maintained in the locally reshaped HDR image (214) generated by the local reshaping operations (212) from the input SDR image (202).

In addition, the multi-level edge-preserving filtering (206) may be applied to generate multiple filtered images such as 206-1 through 206-4 for multiple different levels such as level 1 through level 4. The edge-preserving filtering at each level in the multiple levels may be performed or implemented with a guided image filter that uses a guided image of a single dimension/channel or of multiple dimensions/channels to guide filtering the input SDR image (202). An overall filtered image may be generated as weighted sum 224 from the multiple filtered images generated for the multiple levels by the edge-preserving filtering (e.g., 206-1 through 206-4, etc.).

Given local brightness levels up to per-pixel precision as estimated or approximated by filtered values in the overall filtered image, differences between the local brightness levels and luma or luminance values of the individual pixels can be determined with a subtraction/difference operator 222 up to per-pixel precision.

The differences up to per-pixel precision (or an individual difference for each pixel in the input SDR image (202)) can be used to estimate the desired local L1-mid adjustment 218, for example with an enhancement level 216, to generate L1-mid adjustment up to per-pixel precision (or an individual L1-mid adjustment for each pixel in the input SDR image (202)). The L1-mid adjustment can be further modified with a non-linear activation function to generate modified L1-mid adjustment up to per-pixel precision (or an individual modified L1-mid adjustment for each pixel in the input SDR image (202)).

A predictive model (e.g., as represented in expression (6) below, etc.) for local L1-mid value generation/prediction may be used to generate local L1-mid values up to per-pixel precision (or an individual local L1-mid value for each pixel in the input SDR image (202)) from the modified L1-mid adjustment and the global L1-mid value (204).

These local L1-mid values (210) may be collectively represented as a L1-mid map. Each of the local L1-mid value (210) may be used as an index value to select for a local reshaping function/mapping for a corresponding pixel among the pixels of the input SDR image (202) from a family of reshaping functions/mappings. Thus, a plurality of local reshaping functions/mappings can be selected by these local L1-mid values (210) as index values. The local reshaping operations (212) may be performed by applying the local reshaping functions/mappings to the input SDR image (202) to generate the reshaped HDR image (214).

Basic and Non-Basic Reshaping Functions

FIG. 3A illustrates example basic backward reshaping functions for SDR-to-HDR up-conversion as described herein, in the form of backward reshaping functions (also referred to as backward look up tables or BLUTs) for multiple target L1-mid values setting $\mathcal{L}=\{512, 768, \ldots, 3328\}$. As noted, the basic backward functions may be built or constructed using the training dataset with different target L1-mid values/settings. The global reshaping function (204) used to inform or represent the HDR look of the input SDR image (202) can be selected or linearly interpolated from these basic reshaping functions based on the global L1-mid value determined, or predicted for the input SDR image (202).

In some operational scenarios, these basic reshaping functions for the multiple target L1-mid values/setting may be used to further construct other reshaping functions for other L1-mid values/settings. In many of these reshaping functions, given the same input SDR codeword value, the higher a L1-mid value/setting of a basic reshaping function, the higher a mapped HDR codeword value generated by the basic reshaping function from the input SDR codeword value, which translates into a brighter output HDR look in an HDR image including the mapped HDR codeword value.

Denote the input SDR image (202) and a globally reshaped HDR image—which is globally reshaped from the input SDR image (202) and represents the HDR look of the HDR image (214) locally reshaped from the input SDR image (202)—as S and V, respectively. Denote luma or Y channels of the input SDR image and of the globally reshaped HDR image as $S^Y$ and $V^Y$, respectively. Given a SDR luma or Y codeword value (denoted as $s_i^Y$) for the i-th pixel in the input SDR image (202), and given a backward reshaping function (denoted as $B_L(\ )$) corresponding to or indexed by a L1-mid value/setting denoted as L, a corresponding output HDR luma or Y codeword value (denoted as $v_i^Y$) for the i-th pixel in the (globally reshaped) HDR image may be given, as follows:

$$v_i^Y = B_L(s_i^Y) \qquad (1)$$

The backward reshaping function $B_L(\ )$ (or basic reshaping function) may be pre-calculated and stored as a backward look up table (BLUT) in an image processing system as described herein. For input SDR codewords of bit depth $B^S$, the $B_L(\ )$ has $2^{B^S}$ entries from 0, 1, . . . , $2^{B^S}-1$. In operational scenarios in which $B^S=10$, the basic reshaping function $B_L(\ )$ has 1024 entries.

As noted, the image processing system may be pre-loaded with a plurality of basic reshaping functions. In operational scenarios in which L1-mid values/settings to which the plurality of basic reshaping functions corresponds have a 12-bit precision, these L1-mid values/settings take up a plurality of different values distributed within a 12-bit range of [0 4095].

By way of example but not limitation, the plurality of basic reshaping functions comprise 12 basic reshaping functions for 12 L1-mid values/settings $\mathcal{L} = \{L^{(0)}, L^{(1)}, \ldots, L^{(11)}\} = \{512, 768, \ldots, 3328\}$. Each L1-mid value/setting among the 12 L1-mid values/settings corresponds to a respective basic reshaping function or curve among the 12 basic reshaping functions. In the present example, initially after the system is booted up, 12 basic 1024-entry tone curves (denoted as $B_{512}(\ )$, $B_{768}(\ )$, $B_{3328}(\ )$, respectively) may be available.

Reshaping functions such as forward and backward reshaping functions may be trained or derived from content mapping (CM), tone mapping (TM) and/or display management (DM) algorithms/operations performed on training images in the training data set comprising the HDR-SDR training image pairs. The CM/TM/DM algorithms or operations may or may not provide reshaping functions that are non-intersecting. As illustrated in FIG. 3A, the basic reshaping functions may include some reshaping functions in low L1-mid value range that may intersect between or among different reshaping functions.

The basic reshaping functions may be adjusted or modified to enable the local reshaping (or local tone mapping) to achieve higher local contrast as well as better, more consistent HDR look than what could be achieved with global reshaping. FIG. 3B illustrates example basic reshaping functions after adjustments and modifications.

In some operational scenarios, the basic reshaping functions can be adjusted or modified through extrapolation to become non-intersecting between or among themselves. To ensure the basic reshaping functions non-intersecting between or among themselves, for any given SDR codeword $s^Y$, the basic reshaping functions can be adjusted or modified to satisfy a constraint of monotonically increasing with respect to L1-mid values/settings for the same given SDR codeword, as follows:

$$B_{L^{(i)}}(s^Y) \leq B_{L^{(j)}}(s^Y) \forall i \leq j \qquad (2)$$

To enforce this monotonically increasing property represented in expression (2) above, the intersecting pre-adjusted or pre-modified basic reshaping functions of the low L1-mid values may be replaced by adjusted or modified basic reshaping functions generated through extrapolation performed on the pre-adjusted or pre-modified basic reshaping functions.

For the purpose of illustration only, assume that the first Next basic reshaping curves for L1-mid values $L^{(0)}$, $L^{(1)}$, $L^{(N_{ext}-1)}$ are (intersecting and are) to be replaced. The next two basic tone curves ($L^{(N_{ext})}$ and $L^{(N_{ext}+1)}$) may be used to perform (e.g., linear, etc.) extrapolation using a L1-mid value distance ratio (or a ratio of two differences/distances of L1-mid values). An example procedure for such extrapolation is illustrated in TABLE 1 below.

TABLE 1

```
// extrapolation for the first N_ext tone curves
for (l = 0; l < N_ext; ++l) {
  // weights for extrapolation
  w_{N_ext} = (L^{(N_ext+1)} − L^{(l)})/(L^{(N_ext+1)} − L^{(N_ext)})
  w_{N_ext+1} = (L^{(l)} − L^{(N_ext)})/(L^{(N_ext+1)} − L^{(N_ext)})
  // extrapolation for all SDR value
  for (s^Y = 0; s^Y < 2^{B^S}; ++s^Y) {
    B_{L^{(l)}}(s^Y) = w_{N_ext} B_{L^{(N_ext)}}(s^Y) + w_{N_ext+1} B_{L^{(N_ext+1)}}(s^Y)
  }
}
```

As illustrated in FIG. 3A, the original basic reshaping functions/curves or BLUTs trained from the training HDR-SDR image pairs do not monotonically increase with respect to L1-mid values when L1-mid<=1280. Therefore, the first four basic reshaping functions/curves or BLUTs (where L1-mid values=512, 768, 1024, 1280, respectively) may be replaced with adjusted or modified basic reshaping functions/curves through the linear extrapolation of the two next basic reshaping functions/curves for two L1-mid values 1536 and 1792.

The basic reshaping functions/curves as illustrated in FIG. 3B may be generated from extrapolating the basic reshaping functions/curves of FIG. 3A. As can be seen in FIG. 3B, given an SDR codeword, the basic reshaping functions of FIG. 3B satisfy the condition or constraint under which mapped or reshaped HDR codewords are monotonical increasing with respect to L1-mid values. It should be noted that a more general cleanup procedure as compared with the procedure illustrated in TABLE 1 above may also be used or implemented. Such cleanup procedure may implement program logic for detecting intersecting (or non-monotonical increasing with respect to L1-mid values) basic reshaping functions/curves or BLUTs among all input basic reshaping functions, curves or BLUTs and replace those intersecting basic reshaping functions, curves or BLUTs via extrapolation and/or interpolation from the adjacent or encoding nearest neighbor basic reshaping functions, curves or BLUTs.

Non-basic reshaping functions, curves or BLUTs may be generated from the basic reshaping functions, curves or BLUTs as adjusted or modified if applicable. In some operational scenarios, the non-basic reshaping functions, curves or BLUTs may be generated from the basic reshaping functions, curves or BLUTs through bi-linear interpolation from the nearest basic reshaping functions, curves or BLUTs. Since the basic reshaping functions, curves or BLUTs are already monotonically increasing, the interpolated non-basic reshaping functions, curves or BLUTs also inherit this monotonically increasing property. An example procedure for generating the non-basic reshaping functions, curves or BLUTs from the basic reshaping functions, curves or BLUTs through the bi-linear interpolation is illustrated in TABLE 2 below.

TABLE 2

```
// interpolation for tone curves of arbitrary L1-mid L_curr using existing
tone curves B_L,
L ∈ 𝓛 = {512, 768, . . . , 3328}
// L_curr found in 𝓛
if (L_curr ∈ 𝓛) {
   return B_{L_curr}
}
// L_curr is outside 𝓛
L_min = min(𝓛)
L_max = max(𝓛)
if (L_curr < L_min) {
   return B_{L_min}
}
if (L_curr > L_max) {
   return B_{L_max}
}
// find the existing closest L1-mid to L_curr on the left and right L_left  =  max    L'
          L'∈𝓛,L'≤L L_right =  min    L'
          L'∈𝓛,L'≥L // weights for interpolation
w_left  = (L_right − L_curr)/(L_right − L_left)
w_right = (L_curr  − L_left)/(L_right − L_left)
// extrapolation for all SDR value
for (s^Y = 0; s^Y < 2^B; ++s^Y) {
   B_{L_curr}(s^Y) = w_left B_{L_left}(s^Y) + w_right B_{L_right}(s^Y)
}
return B_{L_curr}
```

In many operational scenarios, the basic reshaping functions and non-basic reshaping functions generated through extrapolation and interpolation as described herein can enable the local reshaping operations (212) to provide higher local contrasts in the (local reshaped) HDR image (214) than those provided in an HDR image using the pre-adjusted or pre-modified reshaping function. The dark regions in the local reshaped HDR image (214) has lower codeword values—which indicate or achieve higher contrast ratios in the local reshaped SDR image (214)—using the adjusted or modified reshaping functions.

Global Reshaping Function Selection

To determine or achieve the overall (e.g., best, desired, target, etc.) HDR look for the HDR image (214) to be generated from the SDR image (202) through local reshaping, a global L1-mid value (denoted as $L^{(g)}$) may be first predicted, using SDR features (of one or more feature types) extracted from the input SDR image (202), based on a polynomial regression model for global L1-mid value prediction. The global L1-mid value $L^{(g)}$ can then be used to search or identify a corresponding global reshaping function (denoted as $B_{L^{(g)}}$) representing the overall HDR look.

In some operational scenarios, for model efficiency and robustness, the polynomial regression model for global L1-mid value prediction may be a first order polynomial (linear) model, as follows:

$$L^{(g)} = c_0 + c_1 \overline{s^Y}, \qquad (3)$$

where $\overline{s^Y}$ represents the mean of SDR codewords of the input SDR image (202) in the luma or Y channel, where the SDR codewords may be normalized in a specific range of values such as between [0, 1]; $c_0$ and $c_1$ represents model parameters for the polynomial regression model.

The polynomial regression model for global L1-mid value prediction may be trained by SDR features (of the same feature types used in actual prediction operations) extracted from training SDR images in a training dataset as described herein that comprises a plurality of HDR-SDR image pairs to obtain optimal values for the model parameters $c_0$ and $c_1$.

In some operational scenarios, to avoid any bias—which may ultimately affect the overall HDR look—caused by possible letter box present in the visual semantic content depicted in the SDR image (202), such letter box if present may be excluded while taking or computing the luma or Y channel mean $\overline{s^y}$.

The exclusion of letterbox as described herein may be performed in both training operations/processes of the polynomial regression model and actual prediction operations/processes based on the polynomial regression model.

In training the regression model with HDR-SDR image pairs, a training SDR image in each HDR-SDR image pair in the HDR-SDR image pairs may be used for feature extraction of SDR features, whereas a training HDR image in the HDR-SDR image pair may be used as a target with which a reshaped HDR image—generated or predicted from backward reshaping the SDR image using a global reshaping function predicted/estimated from the regression model—is compared.

Similarity measures (e.g., costs, errors, quality measures, etc.) may be used to compare the reshaped HDR image with the training HDR image. In some operational scenarios, a peak signal-to-noise ratio (PSNR)—which may empirically have a relatively strong correlation with L1-mid values—can be used as a similarity measure.

Denote HDR codewords of the (original) training HDR image in the luma or Y channel as $V^Y$. Further denote HDR codewords of the reshaped HDR image in the luma or Y channel as $V^{Y*}$. The PSNR of the HDR codewords in the luma or Y channel between the (original) training HDR image and the reshaped HDR image may be determined for the purpose of improving or optimizing the model parameters $c_0$ and $c_1$, as illustrated in TABLE 3 below.

TABLE 3

```
// calculate PSNR between N-pixel B^V-bit HDR images V^Y and V^{Y*}
// mean square error (MSE)
m_sum = 0
for (i = 0; i < N; ++N) {
   m_sum += (v_i^Y − v_i^{Y*})^2
}
MSE = m_sum/N
// maximum possible pixel value
v_max^Y = 2^{B^V} − 1
// PSNR
```

$$PSNR = 10 \times \log_{10}\left(\frac{v_{max}^{Y2}}{MSE}\right)$$

```
return PSNR
```

For a given HDR-SDR (training) image pair (V, S) and their luma or Y channel codewords ($V^Y$, $S^Y$), "ground truth" for model training purposes may be constructed in the form of the best L1-mid value (denoted as $L_{best}$). In some operational scenarios, the best L1-mid value may be determined by applying brute force computation to generate backward reshaped images and to compute corresponding PSNRs for all (candidate) L1-mid values. In some operational scenarios, to avoid or reduce relatively high computation cost for this brute force approach, a two-step method may be implemented or performed to find the best L1-mid value $L_{best}$. The two-step method comprises: (1) coarse search to find an initial L1-mid value denoted as $L_{init}$ (2) iterative refined search to find a (e.g., local optimal, etc.) solution for the best L1-mid value $L_{best}$.

At the first step, the initial L1-mid value $L_{init}$ can be decided by an exhaustive search among L1-mid values {1512, 768, . . . , 3328} corresponding to or indexing the basic reshaping function. Among the (candidate) L1-mid values {512, 768, . . . , 3328}, the L1-mid value corresponding to a basic reshaping function among the basic reshaping functions that generates a reshaped HDR image with the highest PSNR (denoted as $PSNR_{init}$) may be selected as the initial L1-mid value $L_{init}$.

At the second step, gradient information may be iteratively or gradually refine sample point grids starting from the initial L1-mid value $L_{init}$ as the current best L1-mid value $L_{best}$ to find the (final) best L1-mid value $L_{best}$, assuming the PSNR as a function of L1-mid values has a (e.g., globally, locally, converging, etc.) unique maximum point. In each iteration, both left and right directions may be searched for the (current) best L1-mid value $L_{best}$ with a relatively small step size $\Delta L$ (e.g., which initially may be set to an initial value such as $\Delta L_{init}$=128, etc.). The (current) best L1-mid value $L_{best}$ moves to the position or value that gives the largest PSNR. If neither of the left and right directions gives the largest or larger PSNR, the step size may be reduced to one half of the previous value. This iterative process may be repeated until the step size is smaller than a threshold (e.g., $\epsilon_L=10^{-5}$, etc.) and/or until a maximum number of iterations (e.g., $N_{iter,max}$=20, etc.) is reached. As the "ground truth" for the L1-mid value (represented by the (final) best L1-mid value $L_{best}$) is used for training the regression model, the (final) best L1-mid value $L_{best}$ can be a real number, not necessarily limited to only integer.

For any (final) best L1-mid value determined for a given HDR-SDR training image pair that does not correspond to a (e.g., cached, readily available, stored, pre-loaded, etc.) reshaping function, the reshaping function may be generated through interpolation of basic or non-basic reshaping functions (e.g., tone curves, etc.) for the nearest available L1-mid values (e.g., in relation to the (final) best L1-mid value determined for a given HDR-SDR training image pair, etc.).

An example initial coarse search procedure and an example iterative search procedure are illustrated in TABLES 4 and 5 below.

TABLE 4

```
// initialize L1-mid and PSNR using existing tone curves B_L, L ∈ 𝓛 = {512,768,...,3328}
// exhaustive search
L_best = -1
PSNR_best = -∞
for (l = 0; l < |𝓛|; ++l) {
    L_curr = L^(l)
    PSNR_curr = PSNR(V^Y, B_{L_Curr}(S^Y))
    if = (PSNR_curr > PSNR_best) {
        PSNR_best = PSNR_curr
        L_best = L_curr
    }
}
return L_best, PSNR_best
```

TABLE 5

```
// search the best L1-mid
// initialization
(L_init, PSNR_init) from STEP 1
ΔL_init = (L^(1) - L^(0))/2
L_curr = L_init
L_best = L_init
PSNR_curr = PSNR_init
PSNR_best = PSNR_init
ΔL = ΔL_init
N_iter = 0
// iterative search
while (ΔL ≥ ε_L and N_iter < N_iter,max) {
    L_prev = L_curr
    // search left
    L_curr = max(L_prev - ΔL, min(𝓛))
    PSNR_curr = PSNR(V^Y, B_{L_curr}(S^Y))
    if (PSNR_curr > PSNR_best) {
        PSNR_best = PSNR_curr
        L_best = L_curr
        ++N_iter
        continue
    }
    // search right
    L_curr = min(L_prev + ΔL, max(𝓛))
    PSNR_curr = PSNR(V^Y, B_{L_curr}(S^Y))
    if (PSNR_curr > PSNR_best) {
        PSNR_best = PSNR_curr
        L_best = L_curr
        ++N_iter
        continue
    }
    // reduce step size
    ΔL = ΔL/2
    ++N_iter
}
return L_best
```

The two-step search method may be performed for each HDR-SDR training image pair in the training dataset to obtain all "ground truth" for each such image pair in the form of the best L1-mid value. A regression problem for global L1-mid value prediction may be formulated to optimize the model parameters (or polynomial coefficients) $c_0$ and $c_1$, based at least in part on differences between predicted L1-mid values (denoted as "pred" in FIG. 3C) and the ground truth (the best L1-mid values; denoted as "gt" in FIG. 3C). A relatively simple least squared solution as illustrated in FIG. 3C can be used to obtain the model parameters (or polynomial coefficients) $c_0$ and $c_1$. Each data point in FIG. 3C corresponds to an HDR-SDR training image pair and comprises the mean of SDR codewords of the training SDR image (in the HDR-SDR training image pair) in the luma or Y channel and the ground truth or the (final) best L1-mid value for the HDR-SDR training image pair. Example values for the model parameters of the regression model may be (but are not necessarily limited to only): $c_0$=396.6 and $c_1$=3396.4.

Luma Local Reshaping Function Selection

To increase or enhance local contrast ratios in the HDR image (214), for up to each pixel, a local reshaping function may be created or selected to have a higher slope (which corresponds to a higher contrast ratio) than the global reshaping function selected based on the global L1-mid value predicted using the regression model from the mean of SDR codewords of the input SDR image (202) in the luma or Y channel. As previously noted, the regression model may be trained with HDR-SDR training image pairs.

In some operational scenarios, for each pixel represented in the input SDR image (202), a specific local reshaping function may be selected based on a local brightness level—or an estimate, approximation or proxy of the local brightness level in the form of filtered luma values derived by way of multi-level edge-preserving filtering—in a local region around the pixel and may be different from the global reshaping function selected based on the global L1-mid value. This local reshaping function can be applied with the local reshaping operations (212) to achieve relatively optimal performance for local contrast enhancement with relatively low computational costs and with no or little halo artifacts.

Instead of designing a unique local reshaping function from scratch for up to each pixel with relatively high computational cost and time, a pre-calculated (or pre-loaded) BLUT family comprising some or all of basic and non-basic reshaping functions as previously discussed may be used as a set of candidate local reshaping functions. For each pixel, a local reshaping function (or BLUT) may be specifically selected from the BLUT family to obtain or achieve a higher slope or local contrast ratio for the pixel.

The construction, selection and application of the local reshaping function causes local contrast in a local region around the pixel to increase but maintains the overall local brightness unchanged in the local region.

Conceptually, given the i-th pixel in the input SDR image (202) (or the corresponding i-th pixel in the corresponding HDR image (214)), the local region for this pixel may be a set of pixels $\mathcal{W}_i = \{j | j \in \mathcal{N}_{k,i}, s_i^{Y,(l)} - \Delta s^Y < s_j^Y < s_i^{Y,(l)} + \Delta s^Y\}$, where $\mathcal{L}_{k,i}$ represents a k×k neighborhood of the i-th pixel; $s_i^{Y,(l)}$ represents local brightness or a local brightness level around the i-th pixel; and $\Delta s^Y$ represents a small number for local brightness deviations/variations in the local region.

A goal is to find a local reshaping function $f$ (l), which has a higher slope (thus a higher contrast ratio) than the global reshaping function $f^{(g)}$ at $s_i^Y = s_i^{Y,(l)}$ as well as satisfies a condition/constraint: $f^{(l)}(s_i^{Y,(l)}) = f^{(g)}(s_i^{Y,(l)})$ (or provides the same local brightness) at the i-th pixel, as illustrated in FIG. 3D.

It should be noted that some or all techniques as described herein may be implemented without necessarily requiring a strict definition for a local region of a pixel. A local region as described herein may be viewer dependent (e.g., different viewers may perceive brightness in different spatial resolutions, etc.) as well as content dependent (e.g., local brightness for different content or image features in an image may be perceived differently, etc.).

In some operational scenarios, spatial filtering including but not limited to multi-level edge-preserving filtering with applicable spatial kernel sizes (e.g., determined empirically, etc.) may be used to generate a measure or proxy that approximates local brightness around a pixel.

As compared with the approach of using a strict nonflexible definition of a local region around the pixel to compute local brightness, an image processing system as described herein can use filtering to better account for viewer dependency (e.g., through multiple levels of spatial sizes in filtering, etc.) and content dependency (e.g., through edge preserving in filtering, etc.) of how local brightness in an image may be perceived.

The existing global reshaping functions B may be used to construct the local reshaping function for the i-th pixel to guarantee that a local reshaped HDR codeword value from the local reshaping with the local reshaping function for the i-th pixel is within a reasonable range or without a significant deviation from a predicted HDR codeword value predicted from the global reshaping function for the i-th pixel.

The predicted HDR codeword values may be generated from the global reshaping function taking input in the form of the global L1-mid value and the SDR luma or Y codeword value for the i-th pixel.

Likewise, the local reshaped HDR codeword value may be generated from the global reshaping function taking input in the form of the local L1-mid value $L_i^{(l)}$ and the SDR luma or Y codeword value $s_i^Y$ for the i-th pixel, as follows:

$$v_i^Y = B_{L_i^{(l)}}(s_i^Y) = B(L_i^{(l)}, s_i^Y) \tag{4}$$

It is noted that if $L_i^{(l)}$ is made a function of $s_i^Y$, then the reshaping function becomes local to the i-th pixel. More specifically, to obtain a higher slope for the local reshaping function, the local reshaping function in expression (4) above may be selected with a BLUT index depending on the SDR luma or Y codeword value $s_i^Y$, as follows:

$$L_i^{(l)} = L^{(g)} + \alpha(s_i^Y - s_i^{Y,(l)}) \tag{5a}$$

or equivalently:

$$L_i^{(l)} = L^{(g)} + \Delta L_i^{(l)} \tag{5b}$$

where $$\Delta L_i^{(l)} = \alpha(s_i^{(l)} - s_i^{Y,(l)}) \tag{6}$$

The local reshaping function can be shown to have a higher slope than the global reshaping function at the i-th pixel by calculating derivatives $dv_i^Y/ds_i^Y$ at $s_i^Y = s_i^{Y,(l)}$ for both the local and global reshaping functions.

For the global reshaping function, $L_i^{(l)} = L^{(g)}$. Thus, the slope of the global reshaping function is given as follows:

$$\left.\frac{dv_i^Y}{ds_i^Y}\right|_{s_i^Y = s_i^{Y,(l)}} = \left.\frac{dB(L^{(g)}, s_i^Y)}{ds_i^Y}\right|_{s_i^Y = s_i^{Y,(l)}} = \left.\frac{\partial B(L_i^{(l)}, s_i^Y)}{\partial s_i^Y}\right|_{L_i^{(l)} = L^{(g)}, s_i^Y = s_i^{Y,(l)}} \tag{7}$$

For the local reshaping, the slope is given as follows:

$$\left.\frac{dv_i^Y}{ds_i^Y}\right|_{s_i^Y = s_i^{Y,(l)}} = \left[\frac{dL_i^{(l)}}{ds_i^Y} \times \left(\frac{\partial B(L_i^{(l)}, s_i^Y)}{\partial L_i^{(l)}}\right)\right]_{L_i^{(l)} = L^{(g)}} + \tag{8}$$

$$\left.\left(\frac{\partial B(L_i^{(l)}, s_i^Y)}{\partial s_i^Y}\right)\right|_{L_i^{(l)} = L^{(g)}}\bigg|_{s_i^Y = s_i^{Y,(l)}}$$

$$= \left(\alpha \times \frac{\partial B(L_i^{(l)}, s_i^Y)}{\partial L_i^{(l)}}\right)\bigg|_{L_i^{(l)} = L^{(g)}} +$$

$$\left.\left(\frac{\partial B(L_i^{(l)}, s_i^Y)}{\partial s_i^Y}\right)\right|_{L_i^{(l)} = L^{(g)}}\bigg|_{s_i^Y = s_i^{Y,(l)}}$$

$$= \left[\alpha\frac{\partial B(L_i^{(l)}, s_i^Y)}{\partial L_i^{(l)}} + \frac{\partial B(L_i^{(l)}, s_i^Y)}{\partial s_i^Y}\right]_{L_i^{(l)} = L^{(g)}, s_i^Y = s_i^{Y,(l)}}$$

As discussed, the basic and non-basic reshaping function in the BLUT family can be made to satisfy a condition/constraint of being monotonically increasing with respect to L1-mid values with corresponding properties, as follows:

$$\frac{\partial B(L_i^{(l)}, s_i^Y)}{\partial L_i^{(l)}}, \frac{\partial B(L_i^{(l)} s_i^Y)}{\partial s_i^Y} \geq 0 \tag{9}$$

Therefore, assuming $\alpha > 0$ and $\partial B(L_i^{(l)}, s_i^Y)/\partial L_i^{(l)} > 0$ in the non-flat region, the slope of the local reshaping function will be greater than the slope of the global reshaping function at $s^Y=s_i^{Y,(l)}$, resulting in a larger local contrast ratio for the local reshaping function. Accordingly, expressions (5) and (6) can be used to provide a higher or better local contrast ratio.

In some operational scenarios, the following relationship may be set: $\alpha=a_{local} \times c_1$, where $c_1$ is the same as in expression (3) above and $a_{local}$ represents an local enhancement level. Any, some or all of these parameters may be obtained from simulation, training or empirically. Example values for the local enhancement level $a_{local}$ may be, but are not necessarily limited to only: a constant between 0 to 3 depending on a (selected) strength of local contrast ratio. When $a_{local}=0$, the local reshaping function is equivalent to the global reshaping function.

FIG. 3E illustrates example local reshaping functions selected under techniques as described herein in reference to a global reshaping function. These example local reshaping functions are created by fixing $L^{(g)}$ and $\alpha$ and switching between different $s_i^{Y,(l)}$ in expressions (5) and (6) above. Each local reshaping function corresponds to a respective local brightness value $s_i^{Y,(l)}$, which is the SDR value at the intersection with the global reshaping function. As shown in FIG. 3E, at any intersection of a local reshaping function and the global reshaping function, the slope of the local reshaping function is larger than that of the global reshaping function.

Figure 3F:
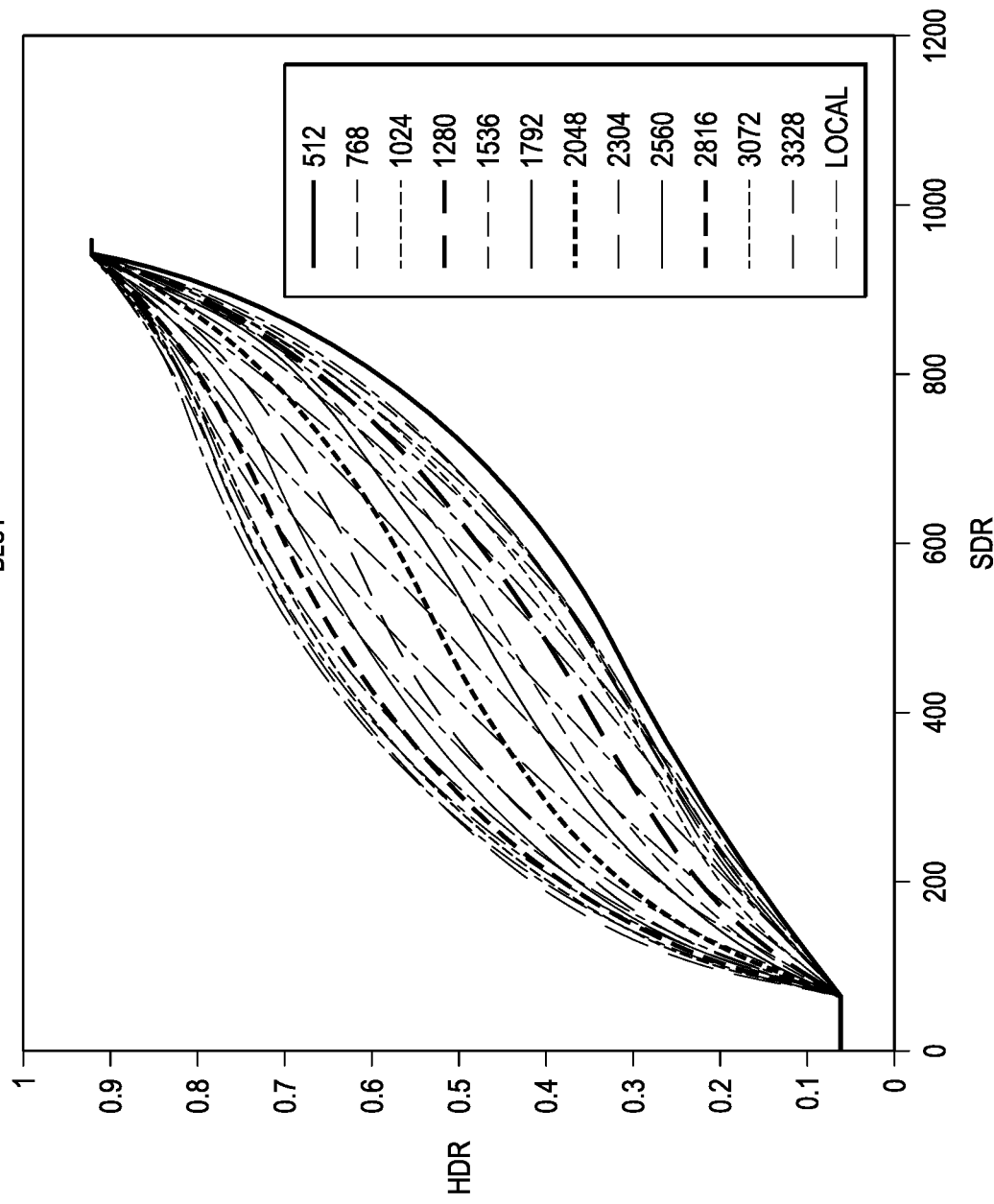

FIG. 3F illustrates example local reshaping functions selected under techniques as described herein in reference to multiple (e.g., actual, candidate, possible, etc.) global reshaping functions. As shown, in comparison with all depicted global reshaping functions, the slope of a local reshaping function is larger at the intersection of the local reshaping function with any global reshaping function.

Additionally, optionally or alternatively, non-linear adjustment may be further made as a part of determining or selecting local reshaping functions for the local reshaping operations (212).

As previously noted, a local reshaping function up to per-pixel precision can be determined or selected from a pre-calculated BLUT family of (basic or non-basic) reshaping functions for all integer values of L1-mid values such as 0 to 4095 inclusive (0, 1, 2, . . . , 4095) that covers some or all of the entire HDR codeword space in the luma or Y channel Some or all of these (candidate) reshaping functions in the pre-calculated BLUT family may be acquired using extrapolation and/or interpolation. This can avoid explicitly calculating an exact local reshaping function for each pixel and/or for each image/frame, for example at runtime when the pixel or image/frame is being processed.

With the pre-calculated BLUT family of (basic or non-basic) reshaping functions, for each image/frame such as the input SDR image (202), a local brightness ($s_i^{Y,(l)}$) can be first calculated for each pixel in the image/frame Image filtering may be used to generate or estimate (e.g., a proxy or approximation of, etc.) the local brightness ($s_i^{Y,(l)}$). The local brightness ($s_i^{Y,(l)}$) can then be used to generate or predict a corresponding L1-mid value ($L^{(l)}$) for each such pixel in the image/frame according to expressions (5) and (6) above, giving rise to a L1-mid map comprising a L1-mid value ($L^{(l)}$) for each pixel in the image/frame.

In some operational scenarios, to prevent L1-mid values from becoming too low and giving an unnatural look on the reshaped HDR image (214), a nonlinear function $f^{SL}(\cdot)$ may be introduced to further adjust the L1-mid values as obtained according to expressions (5) or (6) above, as follows:

$$L_i^{(l)}=L^{(g)}+f^{SL}(\alpha(s_i^{Y,(l)})) \tag{10a}$$

or equivalently:

$$L_i^{Y,(l)}=L^{(g)}+f^{SL}(\Delta L_i^{(l)}) \tag{10b}$$

Figure 3G:
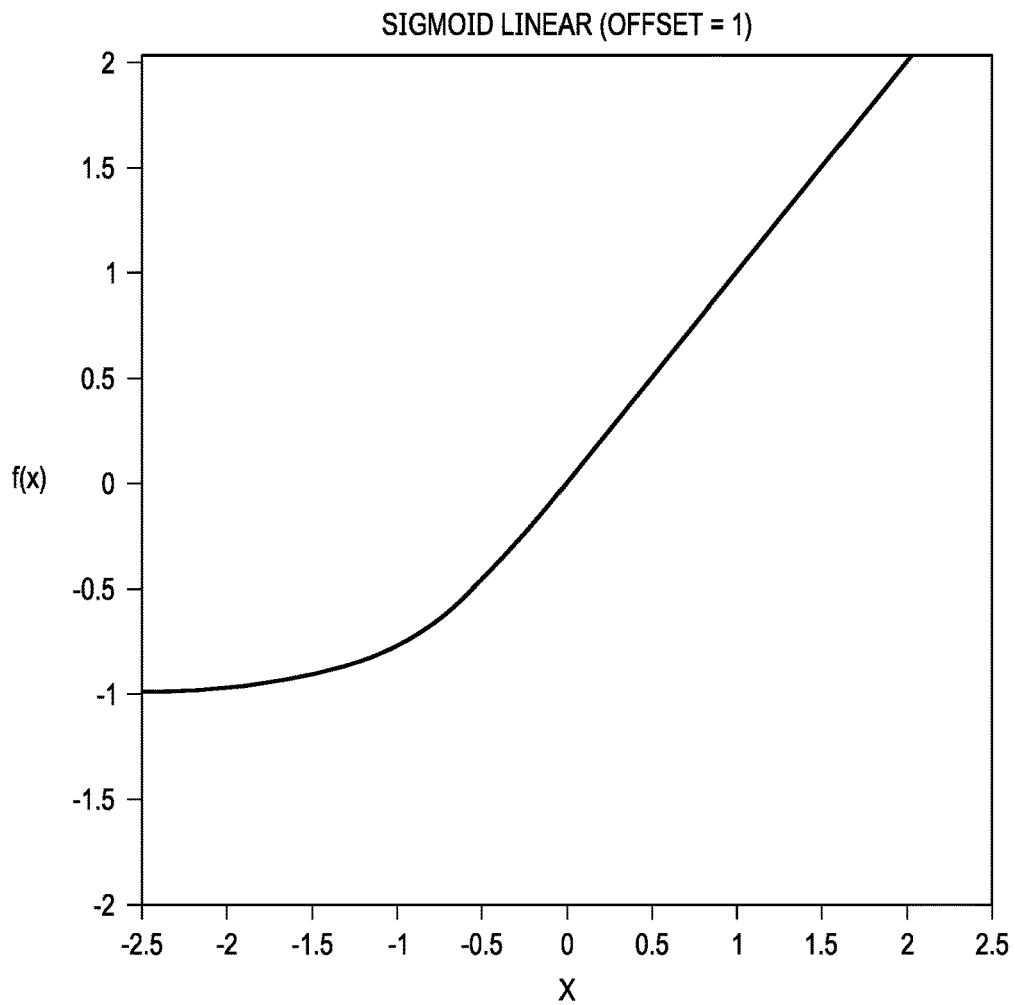
FIG. 3G illustrates an example non-linear function for adjusting a linear regression model used to predict L1-mid values.

By way of example but not limitation, the nonlinear function $f^{SL}(\cdot)$—or a soft clipping function—may be a sigmoid-linear shape function (as illustrated in FIG. 3G) that soft clips the minimum value to an offset value such as −d, as follows.

$$f^{SL}(x) = \begin{cases} x, & x \geq 0 \\ d \times \tanh\left(\frac{x}{d}\right), & x < 0 \end{cases} \tag{11}$$

where d represents a sigmoid offset. Example values of d may be, but are not necessarily limited to only, 200 for (or applicable to) the entire L1-mid value range of [0, 4095].

As shown in expression (11) above, the maximum value may not be adjusted in the nonlinear function $f^{SL}(\cdot)$, allowing the brighter pixels to obtain or retain relatively sufficient highlights. Note that the slope of the nonlinear function $f^{SL}(\cdot)$ at x=0 may be set to equal one (1). An example procedure that uses a sigmoid-linear shape function to adjust L1-mid values for local reshaping is illustrated in TABLE 6 below.

TABLE 6

```
// local reshaping using L1-mid map for image of size W × H
N = WH
// image filtering
s^Y,(l) = image_filtering(s^Y)
// for each pixel, find local reshaping function index and perform local reshaping
for (i = 0; i < N; ++i) {
    // STEP 1: initial local L1-mid selection
    ΔL_i^(l) = α(s_i^Y − s_i^Y,(l))
    // STEP 2: refine adjustment using sigmoid-linear function in expression (11)
    if (ΔL_i^(l) ≥ 0) {
        ΔL_i^(l) = ΔL_i^(l)
    }
    else {
        ΔL_i^(l) = d × tanh(ΔL_i^(l)/d)
    }
    // STEP 3: construct the BLUT index selection
    L_i^(l) = L^(g) + ΔL_i^(l)
    // STEP 4: perform local reshaping
    v_i^Y = B(L_i^(l), s_i^Y)
}
```

In some operational scenarios, the sigmoid-linear function/activation can help avoid or reduce excess enhancement (e.g., further darker, etc.) in the dark area as compared with a (e.g., original, etc.) linear function/activation. The dark area with the sigmoid-linear function or activation may look brighter than with a linear function or activation.

Guided Filtering

While local reshaping functions provide larger contrast ratios in local regions, local brightness levels should be set properly for each pixel so that enhancements from the local reshaping functions look natural. Like local region, local brightness is subjective (viewer dependent) and content dependent. Intuitively, a local brightness level $s_i^{Y,(l)}$ for a pixel should be set as average brightness of pixels near or around the pixel on the same visual object/character or sharing the same light source, so that the pixels belonging to the same visual object/character and/or sharing the same light source can be reshaped with the same or similar local reshaping function(s). However, finding or identifying visual objects/characters and light sources is not a trivial task. In some operational scenarios, edge-preserving image filtering may be used to approximate or realize an effect in which pixels belonging to the same visual object/character and/or sharing the same light source can be reshaped with the same or similar local reshaping function(s), for example without invoking high computational costs to (e.g., explicitly, etc.) finding or identifying visual objects/characters and light sources in an image/frame.

In some operational scenarios, the edge-preserving image filtering may be performed with a guided image filter that can be performed efficiently with relatively low or modest computational cost. Example guided image filtering is described in Kaiming He, Jian Sun, and Xiaoou Tang, "Guided Image Filtering," IEEE Transactions on Pattern Analysis and Machine Intelligence, vol. 35, no. 6, pp. 1397-1409 (2013), which is incorporated herein by reference in its entirety.

Given an input image P such as the input SDR image (202), a guidance image I, a kernel size k and a desired/target degree of smoothness E, the guided image filter can perform local weighted averaging on (codeword values in) the input image similar to a bilateral filter. Weights can be calculated or determined in a way such that contributions to filtered values from pixels on the same side of an edge (e.g., similar color, on the same visual object/character, etc.) in the guidance image is greater than contributions from pixels on the opposite side of the edge (e.g., dissimilar color, on a different visual object/character, etc.). As a result, the pixels on the same side of the edge in the guidance image are averaged together and dominate the filtered values, resulting in an edge-preserving property that efficiently approximates the effect that could be otherwise obtained by invoking high computational costs to (e.g., explicitly, etc.) finding or identifying visual objects/characters and light sources in an image/frame.

The guided filter imposes a constraint that a filtered output result or a filtered image is a linear function in relation to the guidance image with added noise. Accordingly, a constrained optimization problem can be formulated to minimize predictions error in each local region of the input image. This optimization problem may be solved with ridge regression in each local region. The filtering process based on the guidance filter can be sped up through implementing an efficient solution for pixel-wise ridge regression.

An example procedure for filtering the input image P with a guided image filter is illustrated in TABLE 6 below.

TABLE 6

Guided image filter
Input: input image P, guidance image I, kernel size k for mean filter $f_{mean}$, degree of smoothness $\epsilon$
Output: filtered image Q
For the 2D images, perform the following pixel-wise operations
  1. Mean
  $$mean_I = f_{mean}(I)$$
  $$mean_P = f_{mean}(P)$$
  2. Variance and covariance
  $$var_I = f_{mean}(I.* I) - mean_I.* mean_I$$
  $$cov_{IP} = f_{mean}(I.* P) - mean_I.* mean_P$$
  where .* is the pixel-wise multiplication
  3. Ridge regression
  $$a = cov_{IP}./(var_I + \epsilon)$$
  $$b = mean_P - a.* mean_I$$
  where ./ is the pixel-wise division
  4. Mean of regression parameters
  $$mean_a = f_{mean}(a)$$
  $$mean_b = f_{mean}(b)$$
  5. Output
  $$Q = mean_a.* I + mean_b$$

The mean filter ($f_{mean}$) in TABLE 6 above can be obtained or implemented at least in part through generating an integral image from the guidance image I with computations of O(N) time complexity, where N is the number of pixels in the input image.

Given a guidance image I of size W×H, its integral image J is an image of size (W+1)×(H+1), in which each pixel value is the sum of all the pixels above and to the left in I, as follows:

$$J(i, j) = \begin{cases} \sum_{\substack{0 \le i' \le i-1 \\ 0 \le j' \le j-1}} I(i', j') & i, j > 0 \\ 0 & ij = 0 \end{cases} \quad (12)$$

Note that the integral image J may comprise values with higher precision than those in the (input) guidance image I from which the integral image is derived. For an (input) guidance image of bit depth $B^s$ and size W×H, its integral image may comprise values with a precision 1: $W \times H \times 2^{B^s}$. For example, for a 10-bit 1080p input image, its integral image may comprise values with a precision 1: $1920 \times 1080 \times 2^{10} \approx 1: 2.2 \times 10^9$.

An example procedure for mean filtering with an integral image is illustrated in TABLE 7 below. An example procedure for generating the integral image is illustrated in TABLE 8 below. An example auxiliary procedure used in mean filtering as illustrated in TABLE 7 is illustrated in TABLE 9 below.

TABLE 7

```
// mean filtering using integral image
// integral image
J = integral_image(I)
// mean filtering
r = (k - 1)/2
for (i = 0; i < H; ++i) {
    for (j = 0; j < W; ++j) {
        i_min = i - r
        i_max = i + r
        j_min = j - r
        j_max = j + r
        i_min,bound = max(0,i_min)
        i_max,bound = min(H - 1,i_max)
        j_min,bound = max(0,j_min)
        j_max,bound = min(W - 1,j_max)
        // sum of valid pixels
        m = sum_integral(J,i_min,bound,j_min,bound,i_max,bound,j_max,bound)
        // sum of nearest padding
        // top
        if (i_min < i_min,bound) {
            m+= (i_min,bound - i_min) ×
                sum_rectangle(J,i_min,bound,j_min,bound,i_min,bound,j_max,bound)
        }
        // bottom
        if (i_max > i_max,bound) {
            m+= (i_max - i_max,bound) ×
                sum_rectangle(J,i_max,bound,j_min,bound,i_max,bound,j_max,bound)
        }
        // left
        if (j_min < j_min,bound) {
            m+= (j_min,bound - j_min) ×
                sum_rectangle(J,i_min,bound,j_min,bound,i_max,bound,j_min,bound)
        }
        // right
        if (j > j_max,bound) {
            m+= (j_max - j_max,bound) ×
                sum_rectangle (J,i_min,bound,j_max,bound,i_max,bound,j_max,bound)
        }
        // top-left
        if (i_min < i_min,bound and j_min < j_min,bound) {
            m+= (i_min,bound - i_min) × (j_min,bound - j_min) × I(i_min,bound,j_min,bound)
        }
        // top-right
        if (i_min < i_min,bound and j > j_max,bound) {
            m+= (i_min,bound - i_min) × (j_max - j_max,bound) × I(i_min,bound,j_max,bound)
        }
        // bottom-left
```

TABLE 7-continued

```
        if (i_max > i_max,bound and j_min < j_min,bound) {
            m+= (i_max - i_max,bound ) × (j_min,bound - j_min) × I(i_max,bound,j_min,bound)
        }
        // bottom-right
        if (i_max > (i_max,bound and j > j_max,bound) {
            m+= (i_max - i_max,bound) × (j_max - j_max,bound) × I(i_max,bound,j_max,bound)
        }
        G(i,j) = m/(1 + 2r)²
    }
}
return G
```

TABLE 8

```
// integral image
// initialize top row and left column
J(0,0) = 0
for (i = 1; i < H + 1; ++i) {
    J(i,0) = 0
}
for (j = 1; j < W + 1; ++j) {
    J(0,j) = 0
}
// calculate sum
for (i = 1; i < H + 1; ++i) {
    for (j = 1; j < W + 1; ++j) {
        J(i,j) = I(i - 1,j - 1) + J(i - 1,j) + J(i,j - 1) - J(i - 1,j - 1)
    }
}
return J
```

TABLE 9

```
// sum of rectangle area i_min ≤ i ≤ i_max and j_min ≤ j ≤ j_max in I using
   integral image J
m = J(i_max + 1,j_max + 1) + J(i_min,j_min) - J(i_max + 1,i_min) - J(i_min,j_max + 1)
return m
```

When the input image is used as the guidance image, the filtered result is similar to that generated from the bilateral filter, and the pixels with the similar color are averaged together.

In some operational scenarios, a faster version of guided image filter may be implemented or performed to speed up the filter process in which regression is performed in subsampled images.

An example procedure for filtering the input image P with a guided image filter by way of a subsampled image is illustrated in TABLE 10 below.

TABLE 10

Fast guided image filter
Input: input image P, guidance image I, kernel size k for mean filter $f_{mean}$, degree of smoothness $\epsilon$, subsample factor s for subsample/upsample operations $f_{subsample}$ and $f_{upsample}$
Output: filtered image Q
For the 2D images, perform the following pixel-wise operations
1. Subsample
$$I' = f_{subsample}(I, s)$$
$$P' = f_{subsample}(P, s)$$
$$k' = k/s$$
2. Mean (subsampled)
$$mean_I = f_{mean}(I')$$
$$mean_P = f_{mean}(P')$$
3. Variance and covariance (subsampled)
$$var_I = f_{mean}(I'.* I') - mean_I.* mean_I$$
$$cov_{IP} = f_{mean}(I'.* P') - mean_I.* mean_P$$
4. Ridge regression (subsampled)
$$a = cov_{IP}./(var_I + \epsilon)$$
$$b = mean_P - a.* mean_I$$

TABLE 10-continued

5. Mean of regression parameters (subsampled)
$$mean_a = f_{mean}(a)$$
$$mean_b = f_{mean}(b)$$
6. Upsample
$$mean_a = f_{upsample}(mean_a)$$
$$mean_b = f_{upsample}(mean_b)$$
7. Output
$$Q = mean_a.* I + mean_b$$

The functions $f_{subsample}$ and $f_{upsample}$, as referred to in TABLE 10 above, are performed are illustrated in TABLEs 11 and 12 below.

TABLE 11

```
// subsample image
// Input: image I of size W x H, subsample factor s
// Output: subsampled image I'
// output size
H' = [H/s]
W' = [W/s]
// non-overlapping averaging
for (i = 0; i' < H'; + + i') {
    for (j' = 0; j' < W'; + + j') {
        i_min = i' x s
        i_max = i_min + s - 1
        j_min = j' x s
        j_max = j_min + s - 1
        m_sum = 0
        for (i = i_min; i ≤ i_max; + + i) {
            for (j = j_min; j ≤ j_max; + + j) {
                m_sum += I(i,j)
            }
        }
        I'(i',j') = m_sum/s^2
    }
}
return I'
```

TABLE 12

```
// upsample image
// Input: image I' of size W' x H', original size W x H subsample factor s
// Output: upsampled image I
// bilinear upsampling
for (i= 0; i < H; + + i) {
    for (j = 0; j < W; + + j) {
        i_min' = [(1 + 2 x i + s)/(2 x s)] - 1
        i_max' = i_min' + 1
        j_min' = [(1 + 2 x j + s)/(2 x s)] - 1
        j_max' = j_min' + 1
        w_i',min = i_max' - i/s + (s - 1)/(2s)
        w_j',min = j_max' - j/s + (s - 1)/(2s)
        w_i',max = 1 - w_i',min
        w_j',max = 1 - w_j',min
        i_min' = max(i_min',0)
        i_max' = min(i_max',H' - 1)
        j_min' = max(j_min',0)
        j_max' = min(j_max',W' - 1)
        I(i,j) = w_i',min x w_j',min x I'(i_min',j_min') + w_i',min x w_j',max x I'(i_min',j_max')
              + w_i',max x w_j',min x I'(i_max',j_min') + w_i',max x w_j',max x I'(i_max',j_max')
    }
}
return I
```

The selection of the subsampling factor in TABLES 11 and 12 above can be made without sacrificing the final quality of the HDR image (214) as will be further discussed in detail later.

The parameters used in the guided image filter may be compared with parameters used by other image filters. The radius relating to the kernel may be defined as ablur, and the radius relating to the degree of smoothness E in the luma or Y channel) may be defined as ay. These parameters are analogous to standard deviation/radius in Gaussian filter or bilateral filter, where pixels within a radius may be filtered or averaged. Thus, the parameters of guided image filter may be interpreted or specified as follows:

$$k = 2*\sigma_{blur}+1$$

$$\epsilon = \sigma_Y^2 \qquad (13)$$

Image filtering as described herein may deal with inputs of different spatial resolutions. Thus, a parameter such as $\sigma_{blur}$ may be adjusted in proportion to image size. For example, for the purpose of obtaining similar visual effect in different spatial resolutions, $\sigma_{blur}$ may be set to equal 50 for an image in 1920×1080 resolution, and may be set to 25 for the same content in 960×540 resolution. For the degree of smoothness $\epsilon$, the following may be set: $\sigma_Y=0.1$ and $\epsilon=0.01$ for a normalized SDR image (e.g., codewords normalized in a value range of [0, 1], etc.).

Additionally, optionally or alternatively, a guidance image as described herein may have multiple dimensions relating to multiple features. These dimensions of the guidance image do not necessarily relate to color channels YUV or RGB. A covariance matrix across multiple dimensions may be computed instead of just a single (e.g., scalar, etc.) covariance.

An example procedure for filtering the input image P with a guided image filter of multiple dimensions (e.g., three dimensions, etc.) is illustrated in TABLE 13 below.

TABLE 13

```
Fast guided image filter
Input: input image P, 3-channel guidance image I = (I1, I2, I3), where
I1, I2, I3 represent each color channel, kernel size k for mean filter
f_mean, degree of smoothness ε, subsample factor s for subsample/
upsample operations f_subsample and f_upsample
Output: filtered image Q
For the 2D images, perform the following pixel-wise operations
1. Subsample
    I1' = f_subsample(I1, s)
    I2' = f_subsample(I2, s)
    I3' = f_subsample(I3, s)
    P' = f_subsample(P, s)
    k' = k/s
2. Mean (subsampled)
    mean_I1 = f_mean(I1')
    mean_I2 = f_mean(I2')
    mean_I3 = f_mean(I3')
    mean_P = f_mean(P')
    mul_I11 = I1'.* I1'
    mul_I12 = I1'.* I2'
    mul_I13 = I1'.* I3'
    mul_I22 = I2'.* I2'
    mul_I23 = I2'.* I3'
    mul_I33 = I3'.* I3'
    mul_I1P = I1'.* P'
    mul_I2P = I2'.* P'
    mul_I3P = I3'.* P'
3. Variance and covariance (subsampled)
    var_I11 = f_mean(mul_I11) - mean_I1.* mean_I1
    var_I12 = f_mean(mul_I12) - mean_I1.* mean_I2
```

TABLE 13-continued $var_{f13} = f_{mean}(mul_{f13}) - mean_{f1}.* mean_{f3}$
$var_{f22} = f_{mean}(mul_{f22}) - mean_{f2}.* mean_{f2}$
$var_{f23} = f_{mean}(mul_{f23}) - mean_{f2}.* mean_{f3}$
$var_{f33} = f_{mean}(mul_{f33}) - mean_{f3}.* mean_{f3}$
$cov_{f1P} = f_{mean}(mul_{f1P}) - mean_{f1}.* mean_{P}$
$cov_{f2P} = f_{mean}(mul_{f2P}) - mean_{f2}.* mean_{P}$
$cov_{f3P} = f_{mean}(mul_{f3P}) - mean_{f3}.* mean_{P}$ $$var_I = \begin{bmatrix} var_{f11} & var_{f12} & var_{f13} \\ var_{f12} & var_{f22} & var_{f23} \\ var_{f13} & var_{f23} & var_{f33} \end{bmatrix},$$

$$cov = \begin{bmatrix} cov_{f1P} \\ cov_{f2P} \\ cov_{f3P} \end{bmatrix}, \quad invMat = (var_I + \epsilon U)^{-1}$$

4. Ridge regression (subsampled)
    a = invMat × cov
    b = mean$_P$ − a$^T$ · mean$_I$
5. Mean of regression parameters (subsampled)
    mean$_a$ = f$_{mean}$(a)
    mean$_b$ = f$_{mean}$(b)
6. Upsample
    mean$_a$ = f$_{upsample}$(mean$_a$)
    mean$_b$ = f$_{upsample}$(mean$_b$)
7. Output
    Q = mean$_a^T$ · I ++ mean$_b$ In TABLE 13 above, U represents the 3×3 identity matrix. The parameter E for the 3 dimensional guidance image may be scaled based on the total number of dimensions as follows:

$$\epsilon = 3\sigma_\gamma^3 \tag{14}$$

Halo Artifact Reduction

A major artifact that can be resulted from image filtering across large areas in an image is halo artifact. The halo artifact may be caused by local filtering introducing undesired or coincidental smoothing gradients of edges of visual objects/characters. For example, such local image filtering may introduce undesired "enhancement" (bright halos) caused by undesired or coincidental smoothing gradients of edges of a foreground visual object/character such as a girl with a background such as sky. As a result, a bright halo can be generated around the foreground visual object/character such as the girl in an output image generated at least in part from the local image filtering.

While a guided image filter as described herein can be designed to preserve edges, halo artifacts may or may not be completely avoided, given that the guided image filter imposes a local linear model within a non-zero radius and operates with an imperfect (or approximate) ridge regression solution.

In some operational scenarios, the image gradient may be used as a weight factor to adjust the strength or degree of local image filtering. The halo artifact may be more noticeable by audience or viewers when the artifact occurs in a non-textured and smooth areas, such as sky. Thus, the strength or degree of local image filtering can be reduced in those areas to make any halo artifact become not or less noticeable. By way of comparison, the local image filtering in textured areas does not need to be reduced.

It is noted that a guided filter tries to preserve edges to avoid strong smoothing along the edges. If the guidance image has values (which can be positive or negative) of a relatively large magnitude near a sharp edge, then guided image filtering or smoothing along the edge becomes relatively weak, thereby avoiding blurring the edge and reducing the halo artifact near the edge. To achieve this smoothing result, a high frequency feature extracted from the input image may be introduced in one dimension of the guidance image and used to provide additional guidance on the filtering/smoothing. The high frequency feature can be weighted by an inverse of image gradient, as follows:

$$f\,eat = \frac{P - f_{Gauss}(P)}{f_{Gauss}(G_{mag}) + \epsilon_{gmag}} \tag{15}$$

where $f_{Gauss}(\cdot)$ represents pixel-wise Gaussian blurring; $G_{mag}$ represents a pixel-wise image gradient magnitude, for example acquired or obtained using Sobel filter; $\epsilon_{gmag}$ represents a regularization constant (e.g., 0.01 for a normalized SDR image of size 1920×1080 as the input image). The value of $\epsilon_{gmag}$ may be inversely proportional to image resolution of the input image.

The numerator $P - f_{Gauss}(P)$ in expression (15) above represents pixel-wise high frequency components of the input image. A goal of using the high frequency (component) feature instead of the (original) input image is to guide filtering/smoothing with value differences (as measured by the high frequency components extracted from the input image based on a difference between the input image and a Gaussian blurred image) instead of (e.g., original, etc.) input values at or near edges in the input image.

The denominator $f_{Gauss}(G_{mag}) + \epsilon_{gmag}$ in expression (15) above represents the texture strength of the input image. The weighted high frequency feature $f$ eat in expression (15) above can be used as one of the dimensions of the guidance image. This dimension of the guidance image provides relatively high values near edges/boundaries if these locations or areas have relatively high frequency components ($P - f_{Gauss}(P)$) and relatively low texture strengths ($f_{Gauss}(Gmag) + \epsilon_{gmag}$), causing relatively low strengths or degrees of smoothing or enhancement near such locations or areas. On the other hand, if a location or area has both a relatively high frequency component and a relatively high texture strength, the weighted high frequency feature $f$ eat or the dimension of the guidance image provides relatively low values near or at the location or area, causing a relatively high strength or degree of smoothing or enhancement near such location or area. Using a scaling strategy of enhancement or smoothing as implemented with this dimension of the guidance image in the form of the high frequency feature $f$ eat, the difference across edges can be enlarged or maintained if locations or areas near the edges are non-textured and smooth areas. The guided image filter will reduce unwanted smoothing or enhancement given the higher $f$ eat values at these locations or areas.

An example procedure for obtaining pixel-wise image gradient $G_{mag}$ (or $G(i,j)$) using Sobel filter is illustrated in TABLE 14 below. An example procedure for pixel-wise Gaussian blurring is illustrated in TABLE 15 below.

TABLE 14

// image gradient using Sobel filter
// Sobel filter $$h_x = \begin{bmatrix} 1 & 0 & -1 \\ 2 & 0 & -2 \\ 1 & 0 & -1 \end{bmatrix}$$

$$h_y = \begin{bmatrix} 1 & 2 & 1 \\ 0 & 0 & 0 \\ -1 & -2 & -1 \end{bmatrix}$$

TABLE 14-continued

```
// image gradient
for (i = 0; i < H; ++i) {
    for (j = 0; j < W; ++j) {
        m_x = 0
        m_y = 0
        // 2D convolution with nearest padding
        for (m = 0; m < 3; ++m) {
            for (n = 0; n < 3; ++n) {
                m_x += I(clip(i − m + 1, 0, W − 1), clip(j − n + 1, 0, H − 1)) ×
                    h_x(m, n)
                m_y += I(clip(i − m + 1, 0, W − 1), clip(j − n + 1, 0, H − 1)) ×
                    h_y(m, n)
            }
        }
        // magnitude
        G(i, j) = √(m_x² + m_y²)
    }
}
return G
```

TABLE 15

```
// 2D Gaussian filtering (n_σ is the ratio of kernel size to standard
deviation)
// Gaussian kernel
k = n_σσ + 1
r = (k − 1)/2
m_sum = 0
for (m = 0; m < k; ++m) {
```

$$h(m) = \exp\left(\frac{-(m-r)^2}{2\sigma^2}\right)$$

```
    m_sum += h(m)
}
// normalize kernel
for (m = 0; m < k; ++m) {
    h(m)/= m_sum
}
// 2D separable filter
// horizontal filtering
for (i = 0; i < H; ++i) {
    for (j = 0; j < W; ++j) {
        m_sum = 0
        for (m = 0; m < k; ++m) {
            m_sum += I(i, clip(j − m + r, 0, W − 1)) × h(m)
        }
        T(i, j) = m_sum
    }
}
// vertical filtering
for (i = 0; i < H; ++i) {
    for (j = 0; j < W; ++j) {
        m_sum = 0
        for (m = 0; m < k; ++m) {
            m_sum += T(clip(i − m + r, 0, H − 1), j) × h(m)
        }
        G(i, j) = m_sum
    }
}
return G
```

As used herein, a clip function in an expression of b=clip(a, x, y) such as in TABLE 14 above performs the following operations: if(a<x) then b=x; elseif(a>y) then b=y; else b=a.

In some operational scenarios, the high frequency feature feat in expression (15) above may be used as the third dimension of the guidance image, whereas the input image may be used as the first and second dimensions of the guidance image. Additionally, optionally or alternatively, these three dimensions in the guidance image may be adjusted to the same dynamic range. The third dimension in the guidance image can be multiplied with a constant $\alpha_{gradfeat}$ (e.g., 0.3, etc.). Thus, the three dimensions of the guidance image can be specified or defined as follows:

$$\begin{cases} I1 = P \\ I2 = P \\ I3 = \alpha_{gradfeat} \end{cases} * feat \qquad (16)$$

Multi-Level Filtering

A significant aspect of image filtering is kernel size used for filtering. The smaller the kernel size is, the smaller the local region is considered (thus the fewer the pixels in the local region are used or reshaped) during filtering to produce filtering results. On the other hand, the larger the kernel size is, the larger the local region is considered (thus the more the pixels in the local region are used or reshaped) during filtering to produce filtering results. For a relatively small kernel (size), relatively fine image details and textures corresponding to relatively small local regions are enhanced or altered, while relatively coarse image details and textures remain similar to before or little changed. On the other hand, for a relatively large kernel (size), relatively coarse image details and textures corresponding to relatively large local regions are enhanced or altered together, while relatively fine image details and textures remain similar to before or little changed.

Techniques as described herein can be implemented to take advantage of different kernel sizes (e.g., to better account for viewer dependency or content dependency of how local regions or local brightness levels are perceived, etc.). For example, multi-level filtering may be implemented under these techniques to generate an overall combined filtered image $\widetilde{S^{Y,(l)}}$ as a weighted sum of a plurality of different filtered images $S_n^{Y,(l)}$, n=0, 1, ..., $N_K$−1 generated with a plurality of different $N_K$ kernel sizes so that the final reshaped HDR image (214) looks enhanced in all levels (multi-level filtering) corresponding to the multiple different $N_K$ kernel sizes, as follows:

$$\widetilde{S^{Y,(l)}} = \sum_{n=1}^{N_K} w_n S_n^{Y,(l)} \qquad (17)$$

where $w_n$ denotes a weight for the n-th filtered image at the n-th level (or the n-th kernel size in the $N_K$ kernel sizes).

Filtered values (e.g., used as estimates or proxies for local brightness levels $s_i^{Y,(l)}$ in the input SDR image (202), etc.) in the combined filtered image from expression (17) above may be used as input $s_i^{Y,(l)}$ in expression (10a) for local reshaping function selection.

In some operational scenarios, to help provide better looks of reshaped HDR images (e.g., 214 of FIG. 2A or FIG. 2B, etc.), 4 levels (or $N_K$=4) or kernel sizes of image filtering may be used and combined together with respective weight factors. Example kernel sizes for these 4 levels may be but are not necessarily limited to only: $\sigma_{blur}$ (12, 25, 50, 100) for an image size of 1920×1080. Example values for the weight factors may be but are not necessarily limited to only: (0.3, 0.3, 0.2, 0.2).

While computational costs and times can increase with the total number of levels used to obtain the overall combined filtered image, such computational costs and times can be reduced by reusing or sharing some variables or quantities among different levels. Additionally, optionally or alternatively, approximation may be applied when applicable to help prevent computation costs from increasing with kernel sizes.

HDR-SDR training image pairs in a training dataset may be used to help find the best values for some or all operational parameters for the purpose of providing (local contrast) enhancement with no or little halo artifact in the corresponding reshaped HDR images. Video annotation tools may be applied to these images to label or identify foreground, background, image objects/characters, etc., of the images in the image pairs. Example video annotation is described in U.S. Provisional Patent Application Ser. No. 62/944,847, "User guided image segmentation methods and products," by A. Khalilian-Gourtani, et al., filed on Dec. 6, 2019, which is incorporated herein by reference in its entirety. Halo artifact masks (denoted as HAs) may be used to define or identify background pixels surrounding the foreground, image objects/characters, etc. For the purpose of illustration only, these background pixels may be located adjacent to the foreground, image objects/characters, etc., within a distance range (e.g., of 5 to 30 pixels, etc.), for example using a distance transform of the foreground, image objects/characters, etc., as identified in or with a foreground mask (denoted as FG) generated by video annotation tools or object segmentation techniques.

To represent enhancement quantitatively, a region-based texture measure (denoted as tex) in a local foreground area $FG_{n,i}$ can be defined. The local foreground area $FG_{n,i}$ has a center at the i-th pixel of the n-th image. The region-based texture measure tex may be defined or specified as a ratio of variances between the reshaped HDR image (e.g., 214 of FIG. 2A or FIG. 2B, etc.) and the input SDR image (e.g., 202 of FIG. 2A or FIG. 2B, etc.) in the local foreground area $FG_{n,i}$, as follows:

$$tex(FG_{n,i}) = \frac{var(\{V^Y(x) \mid x \in FG_{n,i}\})}{var(\{S^Y(x) \mid x \in FG_{n,i}\})} \quad (18)$$

The region-based texture measure tex can be used to measure increased high frequency components from the local reshaping operations (e.g., 212 of FIG. 2A or FIG. 2B, etc.). A higher value of the region-based texture measure tex indicates a higher local contrast ratio increase from locally reshaping the input SDR to generate the reshaped HDR image.

In addition, a halo measure can be defined as a correlation coefficient between the reshaped HDR image and the input SDR image in a local halo artifact area $HA_{n,i}$ as identified in a halo artifact mask, as follows:

$$halo(HA_{n,i})=1-|corrcoef(\{(S^Y(x),V^Y(x))|x \in HA_{n,i}\})| \quad (19)$$

The halo measure halo can be used to measure inconsistency between the reshaped HDR image and the input SDR as introduced by local reshaping. When there exists a halo artifact in the reshaped HDR image, the reshaped HDR image shows a different trend from the input SDR in—e.g., the background pixels surrounding the foreground, visual objects/characters, etc., identified in—the halo artifact mask. The correlation coefficient in expression (19) above may be used to measure linear correlation between two variables X and Y, as follows:

$$corrcoef(X,Y)=cov(X,Y)/(var(X) \times var(Y))^{0.5} \quad (20a)$$

where the covariance cov(X, Y) is defined as follows:

$$cov(X,Y)=E[(X-E[X]) \times (Y-E[Y])] \quad (20b)$$

Here, E[·] represents a mean value.

A relatively small value of the second term in halo measure halo in expression (19) above implies a relatively weak linear relationship—or a relatively large inconsistency—between the input SDR image and the reshaped HDR image, thereby indicating a relatively strong halo artifact.

A goal to find optimal values for operational parameters as described herein is to provide or generate a large value (e.g., maximal value, etc.) for the texture measure and a small value (e.g., minimal value, etc.) for the halo measure. Example operational parameters for which optimized values may be generated may include, but are not necessarily limited to only, some or all of: $a_{local}$, $\sigma_Y$, $a_{gradfeat}$, $\epsilon_{gmag}$, etc.

In some operational scenarios, SDR images in $N_{image}$ (e.g., $N_{image}$=10, etc.) HDR-SDR training image pairs can be randomly sampled into $N_{sample}$ (e.g., $N_{sample}$=100, etc.) square areas of size r×r (e.g., r=31, etc.) for which foreground masks $FG_{n,i}$ and halo masks $HA_{n,i}$ can be generated. An optimization problem may be formulated, as follows, to obtain the optimal values for the operational parameters:

$$\arg\min \left\{ \frac{1}{N_{image}N_{sample}} \sum_{n=1}^{N_{image}} \sum_{i=1}^{N_{sample}} w_t * tex(FG_{n,i}) + w_h * halo(HA_{n,i}) \right\} \quad (21)$$

In a non-limiting example, a parameter space used to search for the optimal values for the operational parameters may be defined as follows: $a_{local}$=[2,3], $\sigma_Y$=[0.08, 0.12], $a_{gradfeat}$=[0.2, 0.3], and $\epsilon_{gmag}$=[0.03, 0.1]. The best values for the operational parameters may be selected based at least in part on the halo measure and texture measure, as follows: $a_{local}$=3, $\sigma_Y$=0.10, $a_{gradfeat}$=0.3, and $\epsilon_{gmag}$=0.01, for normalized input SDR input images (e.g., comprising normalized SDR codeword values in a normalized value range of [0, 1], etc.).

In some operational scenarios, to speed up image filtering, results from some or all computations can be shared or reused in the local reshaping operations (212), for example in two aspects as follows. First, two of the three dimensions in a guidance image—used to guide filtering to be performed on an input SDR image—may be set as the input SDR image: I1=I2=P, where P represents the input SDR image. As a result, computations and/or computational results relating to mean, mul, var, and coy in the input SDR image and/or in the guidance image can be shared or reused. Second, variables (or quantities) independent of or unaffected by kernel size can be shared across different levels in the multi-level filtering. An example procedure that simplifies or reuses computations and/or computational results (e.g., I1'=$f_{subsample}$(I1, S), mul$_{I11}$=I1'.*I1', etc.) across different levels is illustrated in TABLE 16 below.

TABLE 16

Fast guided image filter (I1 = I2 = P, multi-level filtering)
Input: input image P, guidance image I = (I1, I2, I3), kernel size k, degree of smoothness ϵ, subsample factor s
Output: filtered image Q
For the 2D images, perform the following pixel-wise operations TABLE 16-continued 1. Subsample
$$I1' = f_{subsample}(I1, s)$$
$$I2' = I1'$$
$$I3' = f_{subsample}(I3, s)$$
$$P' = I1'$$
$$k' = k/s$$

2. Mean (subsampled)
$$mean_{f1} = f_{mean}(I1')$$
$$mean_{f2} = mean_{f1}$$
$$mean_{f3} = mean_{f1}$$
$$mean_P = mean_{f1}$$
$$mul_{f11} = I1'.* I1'$$
$$mul_{f12} = mul_{f11}$$
$$mul_{f13} = I1'.* I3'$$
$$mul_{f22} = mul_{f11}$$
$$mul_{f23} = mul_{f13}$$
$$mul_{f33} = I3'.* I3'$$
$$mul_{f1P} = mul_{f11}$$
$$mul_{f2P} = mul_{f11}$$
$$mul_{f3P} = mul_{f13}$$

3. Variance and covariance (subsampled)
$$var_{f11} = f_{mean}(mul_{f11}) - mean_{f1}.* mean_{f1} + \epsilon$$
$$var_{f12} = var_{f11} - \epsilon$$
$$var_{f13} = f_{mean}(mul_{f13}) - mean_{f1}.* mean_{f3}$$
$$var_{f22} = var_{f11}$$
$$var_{f23} = var_{f13}$$
$$var_{f33} = f_{mean}(mul_{f33}) - mean_{f3}.* mean_{f3} + \epsilon$$
$$cov_{f1P} = var_{f11}$$
$$cov_{f2P} = var_{f11}$$
$$cov_{f3P} = var_{f13}$$
$$invMat12 = var_{f23}.* var_{f13} - var_{f12}.* var_{f33}$$
$$covDet = -2\epsilon \times invMat12 + \epsilon^2 \times var_{f33}$$

4. Ridge regression (subsampled)
$$a1 = -\epsilon \times invMat12./covDet$$
$$a2 = a1$$
$$a3 = \epsilon^2 \times var_{f13}./covDet$$
$$b = mean_P - a^T \cdot mean_I$$

5. Mean of regression parameters (subsampled)
$$mean_a = f_{mean}(a)$$
$$mean_b = f_{mean}(b)$$

6. Upsample
$$mean_a = f_{upsample}(mean_a)$$
$$mean_b = f_{upsample}(mean_b)$$

7. Output
$$Q = mean_a^T \cdot I + mean_b$$

Second, Gaussian blurring may be sped up, for example using iterative box filter to approximate Gaussian filter. Example approximation of Gaussian filter with iterative box filter is described in Pascal Getreuer, "A Survey of Gaussian Convolution Algorithms," Image Processing On Line, vol. 3, pp. 286-310 (2013); William M. Wells, "Efficient Synthesis of Gaussian Filters by Cascaded Uniform Filters," IEEE Transactions on Pattern Analysis and Machine Intelligence, vol. 8, no. 2, pp. 234-239 (1986), the contents of which are incorporated herein by reference in its entirety. The total number $NG_{iter}$ of iterations for the iterative box filter may, but is not limited to, be set to three (3). An example procedure that uses iterative box filter to approximate Gaussian filter is illustrated in TABLE 17 below.

TABLE 17

// Gaussian filtering using iterative box filter
Set iteration $NG_{iter}$
// initialization
$$r = floor\left(0.5\sqrt{\frac{12\sigma^2}{NG_{iter}} + 1}\right)$$
k = 2r + 1
G = I
// iterative box filter TABLE 17-continued for (iter = 0; iter < $NG_{iter}$; ++iter) {
   G = box_filter(G, k)
}
return G The effectiveness of sub-sampling in the fast guided image filter may be analyzed. Computation costs/times and visual qualities of reshaped HDR images generated with different values for the sub-sampling factor may be compared to determine optimal values for the sub-sampling factor. In some operational scenarios, a value 2 for the subsample factor s provides a significant speed up (e.g., ~17%, etc.) with no or little visible downgrade in the reshaped HDR images, whereas a value 4 for the subsampling factor s shows visible downgrade or difference. Thus, in some operational scenarios in which computing resources may be limited, subsampling may be implemented or performed in multi-level filtering as described herein with a value 2 for the subsample factor s.

Figure 2C:
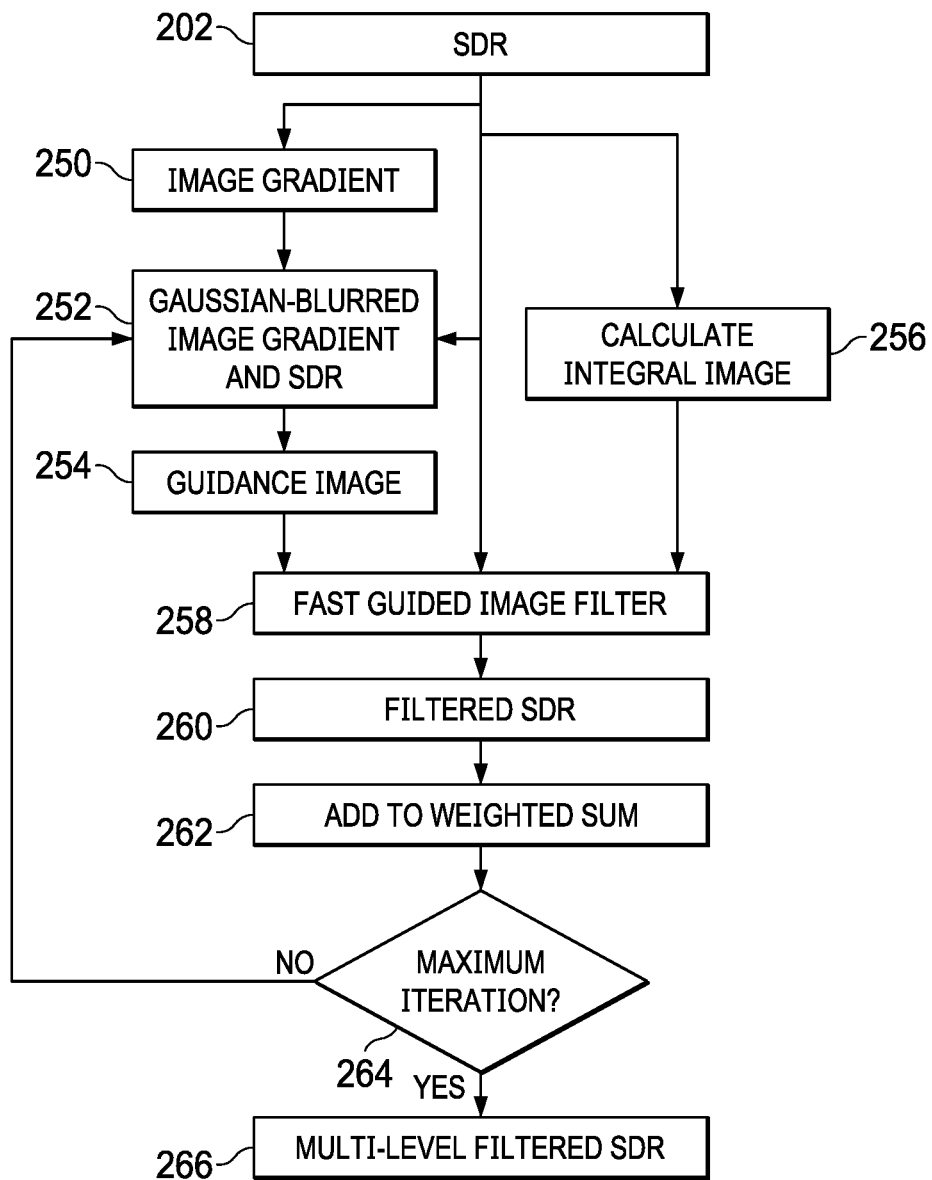
FIG. 2C illustrates an example flow for applying multi-level edge-preserving filtering.

FIG. 2C illustrates an example flow for applying multi-level edge-preserving filtering. In some embodiments, one or more computing devices or components (e.g., an encoding device/module, a transcoding device/module, a decoding device/module, an inverse tone mapping device/module, a tone mapping device/module, a media device/module, a reverse mapping generation and application system, etc.) may perform some or all operations in this flow.

Block 250 comprises receiving an input SDR image (e.g., 202 of FIG. 2A or FIG. 2B, etc.) and computing image gradient for the input SDR image (202). Block 252 comprises using the input SDR image (202) and the image gradient to generate Gaussian blurred image gradient and a Gaussian blurred SDR image, for example for a current level in multiple levels (or multiple iterations), where the current level is set to the first level of the multiple levels in a specific processing order. Block 254 comprises generating a Guidance image from the Gaussian blurred image gradient and Gaussian blurred SDR image. Block 256 comprises using the input SDR image (202) to compute an integral image (for the input SDR image (202). Block 258 comprises applying fast guided image filtering with the guidance image and the integral image to generate a filtered SDR image 260 for the input SDR image (202) for the current level. Blocks 262 comprises adding the filtered SDR image (260) to a weighted sum (which may be initialized to zero or empty) of filtered SDR images for the multiple levels. Block 264 comprises determining whether a maximum iteration or level has been reached. If the maximum iteration or level has been reached ("yes"), then the weighted sum is taken as a multi-level filtered SDR image (266). On the other hand, if the maximum iteration or level has not been reached ("no"), then the current level is incremented and the flow goes back to block 252.

MMR-based reshaping/mappings may be used to perform or carry out chroma reshaping that generates reshaped HDR codewords for a reshaped HDR image (e.g., 214 of FIG. 2A or FIG. 2B, etc.) in chroma channels from luma and chroma SDR codewords in an input SDR image (e.g., 202 of FIG. 2A or FIG. 2B, etc.).

Similar to pre-calculating a BLUT family of basic or non-basic (BLUT) reshaping functions for a plurality of different L1-mid values for luma local reshaping (or generating reshaped luma or Y channel HDR codewords in reshaped HDR images from locally reshaping luma or Y channel SDR codewords in input SDR images), a backward MMR (BMMR) family of basic or non-basic (BMMR) reshaping mappings for the plurality of different L1-mid values for chroma local reshaping.

The basic or non-basic (BMMR) reshaping mappings may be respectively specified by a plurality of sets of MMR coefficients. Each (BMMR) reshaping mapping in the BMMR family may be specified with a respective set of MMR coefficients in the plurality of sets of MMR coefficients. These sets of MMR coefficients can be pre-calculated and/or preloaded during a system initialization/boot-up period of an image processing system as described herein. As a result, there is no need to generate MMR coefficients for chroma local reshaping at runtime when input SDR images are locally reshaped into HDR images. Extrapolation and/or interpolation may be performed to extend basic sets of BMMR coefficients for chroma channels to non-basic sets of BBMR coefficients for other L1-mid values in the BMMR family.

As a L1-mid map can be generated from luma local reshaping, the same L1-mid map may be used to select or look up for a specific BMMR set of MMR coefficients for a specific L1-mid value for chroma local reshaping. The specific BMMR set of MMR coefficients for the specific L1-mid value—which represents a specific BMMR reshaping/mapping for the specific L1-mid value—in combination of a specific BLUT for the specific L1-mid value selected or looked up in the BLUT family can be applied to an input SDR image to generate reshaped color—increasing color saturation while matching the overall HDR tone/look (e.g., as determined with training HDR-SDR images, etc.) as indicated with global luma and chroma reshaping function/mapping corresponding to a global L1-mid value determined from the input SDR image—in the reshaped HDR image.

A set of MMR coefficients may be selected or looked up for up to per-pixel precision based on L1-mid values/indexes indicated in the L1-mid map. For up to each pixel, chroma local reshaping may be performed for the chroma channels Cb and Cr, as follows:

$$\begin{cases} v_i^{Cb} = MMR_{L_i^t}^{Cb}(s_i^Y, s_i^{Cb}, s_i^{Cr}) \\ v_i^{Cr} = MMR_{L_i^t}^{Cr}(s_i^Y, s_i^{Cb}, s_i^{Cr}) \end{cases} \quad (22)$$

In many operational scenarios, reshaped Cb and Cr HDR codewords cause corresponding reshaped colors to become more saturated (e.g., distances of the corresponding reshaped colors to neutral or grayscale colors, such as measured by $|v_i^{Cb}-(2^{B^v}-1)/2|$ and $|v_i^{Cr}-(2^{B^v}-1)/2|$, become larger) when L1-mid values become larger, especially for relatively low input SDR luma or Y codewords. As a result, in local reshaping with the local L1-mid map, pixels with brighter luma or luminance levels become more saturated, whereas pixels with darker luma or luminance levels become less saturated.

In some operational scenarios, linear segment-based structures may be used in local reshaping SDR images into HDR images. Example linear segment-based structures are described in U.S. Pat. No. 10,397,576, "Reshaping curve optimization in HDR coding," by H. Kadu and G-M. Su, the entire contents of which are hereby incorporated by reference as if fully set forth herein.

Some or all techniques as described herein can be implemented and/or performed as parts of real time operation for broadcast video applications, real time streaming applications, etc. Additionally, optionally or alternatively, some or all techniques as described herein can be implemented and/or performed as parts of time-delay or offline operation for non-real time streaming applications, cinema applications, etc.

Example Process Flows

Figure 4:
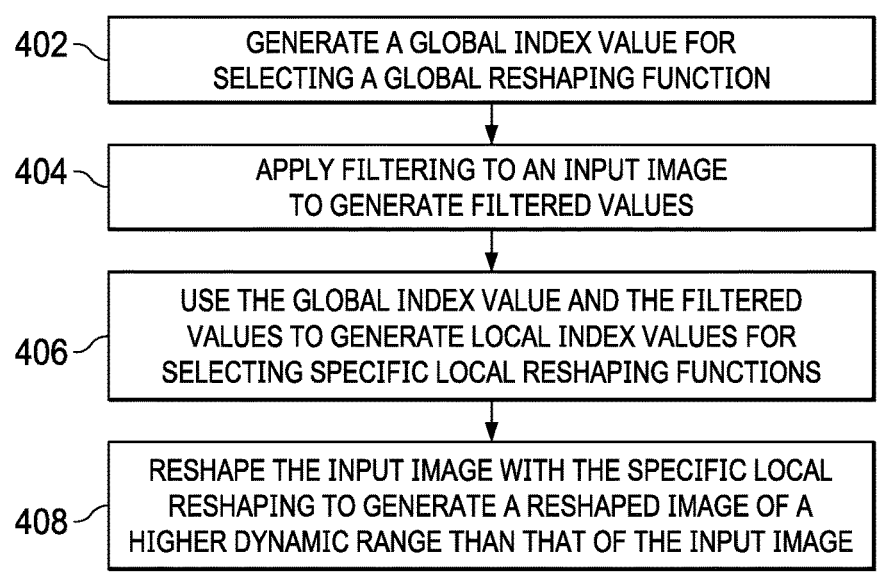
FIG. 4 illustrates an example process flow.

FIG. 4 illustrates an example process flow according to an embodiment. In some embodiments, one or more computing devices or components (e.g., an encoding device/module, a transcoding device/module, a decoding device/module, an inverse tone mapping device/module, a tone mapping device/module, a media device/module, a reverse mapping generation and application system, etc.) may perform this process flow. In block 402, an image processing system generates a global index value for selecting a global reshaping function for an input image of the second dynamic range. The global index value is generated using luma codewords in the input image.

In block 404, the image processing system applies image filtering to the input image to generate a filtered image. Filtered values of the filtered image provide a measure of local brightness levels in the input image.

In block 406, the image processing system generates local index values for selecting specific local reshaping functions for the input image. The local index values are generated using the global index value and the filtered values of the filtered image.

In block 408, the image processing system causes a reshaped image of the first dynamic range to be generated at least in part by reshaping the input image with the specific local reshaping functions selected using the local index values.

In an embodiment, the local index values are represented in a local index value map.

In an embodiment, the first dynamic range represents a high dynamic range; the second dynamic range represents a standard dynamic range lower than the high dynamic range.

In an embodiment, the specific local reshaping functions selected using the local index values reshape the luma codewords in the input image into luma codewords in the HDR image; the local index values are further used to select specific local reshaping mappings that map luma codewords and chroma codewords in the input image into chroma codewords in the reshaped image.

In an embodiment, the specific local reshaping functions are represented by backward reshaping look up tables; the specific local reshaping mappings are represented by backward multivariate multiple regression mappings.

In an embodiment, the local index values are generated from the global index value and the filtered values using a predictive model trained with training image pairs in a training dataset; each of the training image pairs comprises a training image of the first dynamic range and a training image of the second dynamic range; the training image of the first dynamic range and the training image of the second dynamic range depict same visual semantic content.

In an embodiment, each of the specific local reshaping functions is selected based on a respective local index value of the local index values from among a plurality of preloaded reshaping functions.

In an embodiment, the plurality of preloaded reshaping functions is generated from basic reshaping functions through one of: interpolation, extrapolation, or a combination of interpolation and extrapolation; the basic reshaping functions are determined with a training data set comprising a plurality of training image pairs; each of the training image pairs comprises a training image of the first dynamic range and a training image of the second dynamic range; the training image of the first dynamic range and the training image of the second dynamic range depict same visual semantic content.

In an embodiment, the reshaped image is generated by a video encoder that has generated the global index value and the local index values.

In an embodiment, the reshaped image is generated by a recipient device other than a video encoder that has generated the global index value and the local index values.

In an embodiment, the filtered image is a weighted sum of a plurality of individual filtered images generated by image filtering at a plurality of levels for kernel sizes.

In an embodiment, the image filtering is applied to the input image with a guidance image to reduce halo artifacts.

In an embodiment, the image filtering represents one of: guided image filtering, non-guided image filtering, multi-level filtering, edge-preserving filtering, multi-level edge-preserving filtering, non-multi-level edge-preserving filtering, multi-level non-edge-preserving filtering, non-multi-level non-edge-preserving filtering, etc.

In an embodiment, the local index values are generated based at least in part on a soft clipping function; the soft clipping function accepts scaled differences between the luma codewords and the filtered values as input; the soft clipping function is specifically selected to generate output values no less than a minimum value for dark pixels of the input image.

In an embodiment, the image filtering represents guided image filtering applied with a guided image; the guided image includes high frequency feature values computed for a plurality of pixel locations as respectively weighted by inverses of image gradients computed for the plurality of pixel locations in one of one or more channels of the guided image.

In an embodiment, the guided image includes guided image values derived based at least in part on a set of halo reduction operational parameters; the image processing system is further configured to perform: for each image pair among a plurality of image pairs, computing, with a plurality of sets of candidate values for the set of the halo reduction operational parameters, a region-based texture measure in a local foreground area among one or more local foreground areas as a ratio of variances of a training image of the first dynamic range and a corresponding training image of the second dynamic range in the image pair, the one or more local foreground areas being sampled from a foreground mask identified in the training image of the first dynamic range in the image pair; for each image pair among the plurality of image pairs, computing, with the plurality of sets of candidate values for the set of the halo reduction operational parameters, a halo measure in a local halo artifact area among one or more local halo artifact areas as a correlation coefficient between a training image of the first dynamic range and a corresponding training image of the second dynamic range in the image pair, the one or more local halo artifact areas being sampled from a halo mask identified in the corresponding training image of the second dynamic range; computing, for the plurality of sets of candidate values for the set of halo reduction operational parameters, respective weighted sums of (a) all region-based texture measures for all local foreground areas sampled from foreground masks identified in training images of the first dynamic range in the plurality of image pairs and (b) all halo measures for all local halo artifact areas sampled from halo masks identified in corresponding training images of the second dynamic range in the plurality of image pairs; determining a set of optimized values for the set of halo reduction operational parameters, the set of optimized values being used to generate a minimized weighted sum of (a) all the region-based texture measures for all the local foreground areas sampled from the foreground masks identified in the training images of the first dynamic range in the plurality of image pairs and (b) all the halo measures for all the local halo artifact areas sampled from the halo masks identified in the corresponding training images of the second dynamic range in the plurality of image pairs; applying the image filtering in multiple spatial kernel size levels to the input image with the set of optimized values for the set of halo reduction operational parameters.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the disclosure. For example, one or more processors in a display, an encoder, a set top box, a transcoder or the like may implement methods related to adaptive perceptual quantization of HDR images as described above by executing software instructions in a program memory accessible to the processors. Embodiments of the invention may also be provided in the form of a program product. The program product may comprise any non-transitory medium which carries a set of computer-readable signals comprising instructions which, when executed by a data processor, cause the data processor to execute a method of an embodiment of the invention. Program products according to embodiments of the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
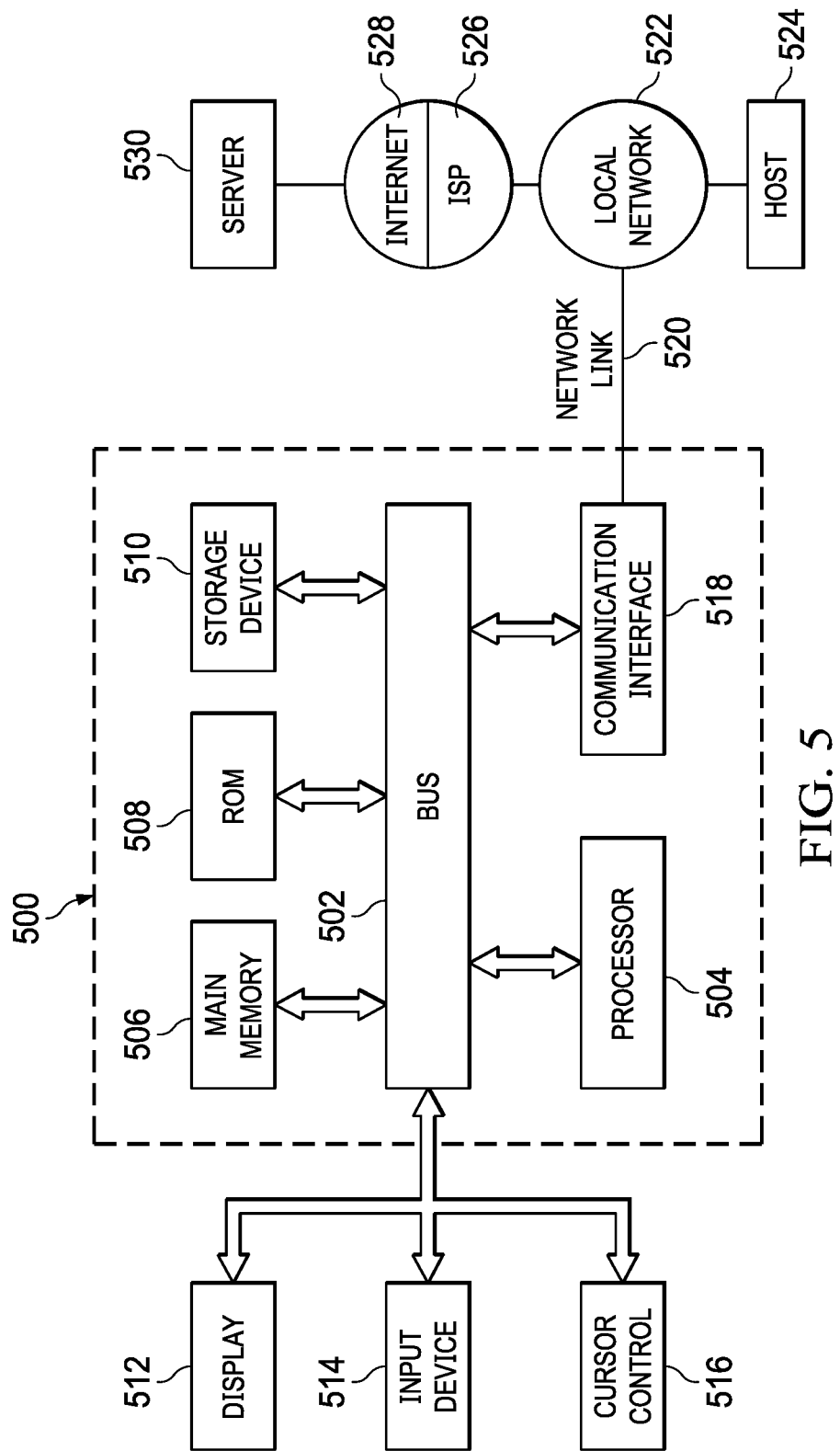
FIG. 5 illustrates a simplified block diagram of an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is claimed embodiments of the invention, and is intended by the applicants to be claimed embodiments of the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

ENUMERATED EXEMPLARY EMBODIMENTS

The invention may be embodied in any of the forms described herein, including, but not limited to the following Enumerated Example Embodiments (EEEs) which describe structure, features, and functionality of some portions of embodiments of the present invention.

EEE1. A method for generating images of a first dynamic range from input images of a second dynamic range lower than the first dynamic range, comprising:
　generating, using luma codewords in the input image, a global index value for selecting a global reshaping function for an input image of the second dynamic range;
　applying image filtering to the input image to generate a filtered image, filtered values of the filtered image providing a measure of local brightness levels in the input image;
　generating, using the global index value and the filtered values of the filtered image, local index values for selecting specific local reshaping functions for the input image;
　causing a reshaped image of the first dynamic range to be generated at least in part by reshaping the input image with the specific local reshaping functions selected using the local index values.

EEE2. The method of EEE1, wherein the local index values are represented in a local index value map.

EEE3. The method of EEE1 or EEE2, wherein the first dynamic range represents a high dynamic range; wherein the second dynamic range represents a standard dynamic range lower than the high dynamic range.

EEE4. The method of any of EEE1-EEE3, wherein the specific local reshaping functions selected using the local index values reshape the luma codewords in the input image into luma codewords in the HDR image; wherein the local index values are further used to select specific local reshaping mappings that map luma codewords and chroma codewords in the input image into chroma codewords in the reshaped image.

EEE5. The method of EEE4, wherein the specific local reshaping functions are represented by backward reshaping look up tables; wherein the specific local reshaping mappings are represented by backward multivariate multiple regression mappings.

EEE6. The method of any of EEE1-EEE5, wherein the local index values are generated from the global index value and the filtered values using a predictive model trained with training image pairs in a training dataset; wherein each of the training image pairs comprises a training image of the first dynamic range and a training image of the second dynamic range; wherein the training image of the first dynamic range and the training image of the second dynamic range depict same visual semantic content.

EEE7. The method of any of EEE1-EEE6, wherein each of the specific local reshaping functions is selected based on a respective local index value of the local index values from among a plurality of preloaded reshaping functions.

EEE8. The method of EEE7, wherein the plurality of preloaded reshaping functions are generated from basic reshaping functions through one of: interpolation, extrapolation, or a combination of interpolation and extrapolation; wherein the basic reshaping functions are determined with a training data set comprising a plurality of training image pairs; wherein each of the training image pairs comprises a training image of the first dynamic range and a training image of the second dynamic range; wherein the training image of the first dynamic range and the training image of the second dynamic range depict same visual semantic content.

EEE9. The method of any of EEE1-EEE8, wherein the reshaped image is generated by a video encoder that has generated the global index value and the local index values.

EEE10. The method of any of EEE1-EEE9, wherein the reshaped image is generated by a recipient device other than a video encoder that has generated the global index value and the local index values.

EEE11. The method of any of EEE1-EEE10, wherein the filtered image is a weighted sum of a plurality of individual filtered images generated by image filtering at a plurality of levels for kernel sizes.

EEE12. The method of any of EEE1-EEE11, wherein the image filtering is applied to the input image with a guidance image to reduce halo artifacts.

EEE13. The method of any of EEE1-EEE10, wherein the image filtering represents one of: guided image filtering, non-guided image filtering, multi-level filtering, edge-preserving filtering, multi-level edge-preserving filtering, non-multi-level edge-preserving filtering, multi-level non-edge-preserving filtering, or non-multi-level non-edge-preserving filtering.

EEE14. The method of any of EEE1-EEE13, wherein the local index values are generated based at least in part on a soft clipping function; wherein the soft clipping function accepts scaled differences between the luma codewords and the filtered values as input; wherein the soft clipping function is specifically selected to generate output values no less than a minimum value for dark pixels of the input image.

EEE15. The method of any of EEE1-EEE14, wherein the image filtering represents guided image filtering applied with a guided image; wherein the guided image includes high frequency feature values computed for a plurality of pixel locations as respectively weighted by inverses of image gradients computed for the plurality of pixel locations in one of one or more channels of the guided image.

EEE16. The method of any of EEE1-EEE15, wherein the guided image includes guided image values derived based at least in part on a set of halo reduction operational parameters; the method further comprising:

for each image pair among a plurality of image pairs, computing, with a plurality of sets of candidate values for the set of the halo reduction operational parameters, a region-based texture measure in a local foreground area among one or more local foreground areas as a ratio of variances of a training image of the first dynamic range and a corresponding training image of the second dynamic range in the image pair, wherein the one or more local foreground areas are sampled from a foreground mask identified in the training image of the first dynamic range in the image pair;

for each image pair among the plurality of image pairs, computing, with the plurality of sets of candidate values for the set of the halo reduction operational parameters, a halo measure in a local halo artifact area among one or more local halo artifact areas as a correlation coefficient between a training image of the first dynamic range and a corresponding training image of the second dynamic range in the image pair, wherein the one or more local halo artifact areas are sampled from a halo mask identified in the corresponding training image of the second dynamic range;

computing, for the plurality of sets of candidate values for the set of halo reduction operational parameters, respective weighted sums of (a) all region-based texture measures for all local foreground areas sampled from foreground masks identified in training images of the first dynamic range in the plurality of image pairs and (b) all halo measures for all local halo artifact areas sampled from halo masks identified in corresponding training images of the second dynamic range in the plurality of image pairs;

determining a set of optimized values for the set of halo reduction operational parameters, wherein the set of optimized values is used to generate a minimized weighted sum of (a) all the region-based texture measures for all the local foreground areas sampled from the foreground masks identified in the training images of the first dynamic range in the plurality of image pairs and (b) all the halo measures for all the local halo artifact areas sampled from the halo masks identified in the corresponding training images of the second dynamic range in the plurality of image pairs;

applying the image filtering in multiple spatial kernel size levels to the input image with the set of optimized values for the set of halo reduction operational parameters.

EEE17. A computer system configured to perform any one of the methods recited in EEE1-EEE16.

EEE18. An apparatus comprising a processor and configured to perform any one of the methods recited in EEE1-EEE16.

EEE19. A non-transitory computer-readable storage medium having stored thereon computer-executable instruction for executing a method in accordance with any of the methods recited in EEE1-EEE16.

The invention claimed is:

1. A method for generating images of a first dynamic range from input images of a second dynamic range lower than the first dynamic range, the method comprising:

generating, using luma codewords in the input image, a global index value for selecting a global reshaping function for an input image of the second dynamic range, wherein the global index value is an L1-mid value predicted from a mean of luma SDR codewords in the input image by using a polynomial regression model;

applying image filtering to the input image to generate a filtered image, the input image comprising a plurality of regions up to per-pixel precision, and generating, for each region, a filtered value of the filtered image providing a measure of a local brightness level in the respective region of the input image;

generating, using the global index value and the filtered values of the filtered image, local index values for selecting specific local reshaping functions for the respective region of the input image, wherein each local index value is a predicted local L1-mid value related to the average luminance level of the respective region, wherein generating the local index value of each region comprises:

determining the difference between the local brightness level estimated from the corresponding filtered value and the luminance level of the individual pixels of the respective region;

estimating a local L1-mid adjustment from the determined difference; and predicting the local L1-mid value from the global index value and the local L1-mid adjustment;

causing a reshaped image of the first dynamic range to be generated at least in part by reshaping the input image with the specific local reshaping functions selected using the local index values, wherein the specific local reshaping functions selected using the local index values reshape the luma codewords in the input image into luma codewords in the HDR image.

2. The method of claim 1, wherein the local index values are represented in a local index value map.

3. The method of claim 1, wherein the first dynamic range represents a high dynamic range; wherein the second dynamic range represents a standard dynamic range lower than the high dynamic range.

4. The method of claim 1, wherein the local index values are further used to select specific local reshaping mappings that map luma codewords and chroma codewords in the input image into chroma codewords in the reshaped image.

5. The method of claim 1, wherein the local index values are generated from the global index value and the filtered values using a predictive model trained with training image pairs in a training dataset; wherein each of the training image pairs comprises a training image of the first dynamic range and a training image of the second dynamic range; wherein the training image of the first dynamic range and the training image of the second dynamic range depict same visual semantic content.

6. The method of claim 1, wherein each of the specific local reshaping functions is selected based on a respective local index value of the local index values from among a plurality of preloaded reshaping functions.

7. The method of claim 1, wherein the reshaped image is generated by a video encoder that has generated the global index value and the local index values.

8. The method of claim 1, wherein the reshaped image is generated by a recipient device other than a video encoder that has generated the global index value and the local index values.

9. The method of claim 1, wherein the filtered image is a weighted sum of a plurality of individual filtered images generated by image filtering at a plurality of levels for kernel sizes.

10. The method of claim 1, wherein the image filtering is applied to the input image with a guidance image to reduce halo artifacts.

11. The method of claim 1, wherein the image filtering represents one of: guided image filtering, non-guided image filtering, multi-level filtering, edge-preserving filtering, multi-level edge-preserving filtering, non-multi-level edge-preserving filtering, multi-level non-edge-preserving filtering, or non-multi-level non-edge-preserving filtering.

12. The method of claim 1, wherein the local index values are generated based at least in part on a soft clipping function; wherein the soft clipping function accepts scaled differences between the luma codewords and the filtered values as input; wherein the soft clipping function is specifically selected to generate output values no less than a minimum value for dark pixels of the input image.

13. The method of claim 1, wherein the image filtering represents guided image filtering applied with a guided image; wherein the guided image includes high frequency feature values computed for a plurality of pixel locations as respectively weighted by inverses of image gradients computed for the plurality of pixel locations in one of one or more channels of the guided image.

14. An apparatus comprising a processor and configured to perform the method recited in claim 1.

15. A non-transitory computer-readable storage medium having stored thereon computer-executable instruction for executing a method with one or more processors in accordance the method recited in claim 1.

* * * * *